(12) United States Patent
Miyake

(10) Patent No.: US 12,375,907 B2
(45) Date of Patent: *Jul. 29, 2025

(54) NON-TRANSITORY COMPUTER-READABLE MEDIUM STORING COMPUTER-READABLE INSTRUCTIONS FOR TERMINAL DEVICE AND COMMUNICATION DEVICE

(71) Applicant: BROTHER KOGYO KABUSHIKI KAISHA, Nagoya (JP)

(72) Inventor: Takeshi Miyake, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,862

(22) Filed: Oct. 16, 2023

(65) Prior Publication Data

US 2024/0048976 A1 Feb. 8, 2024

Related U.S. Application Data

(63) Continuation of application No. 18/164,263, filed on Feb. 3, 2023, now Pat. No. 11,825,302, which is a continuation of application No. 16/740,673, filed on Jan. 13, 2020, now Pat. No. 11,595,814.

(30) Foreign Application Priority Data

Jan. 16, 2019 (JP) .................................. 2019-005470

(51) Int. Cl.
*H04W 12/037* (2021.01)
*H04L 9/14* (2006.01)
(Continued)

(52) U.S. Cl.
CPC ............ *H04W 12/037* (2021.01); *H04L 9/14* (2013.01); *H04L 9/30* (2013.01); *H04W 12/06* (2013.01);
(Continued)

(58) Field of Classification Search
None
See application file for complete search history.

(56) References Cited

U.S. PATENT DOCUMENTS 11,595,814 B2 2/2023 Miyake
2016/0055485 A1 2/2016 Benoit et al.
(Continued)

OTHER PUBLICATIONS

D. He,. et al., "A Provably-Secure Cross-Domain Handshake Scheme with Symptoms-Matching for Mobile Healthcare Social Network," in IEEE Transactions on Dependable and Secure Computing, vol. 15, No. 4, pp. 633-645, Jul. 1-Aug. 2018 (Year: 2018).*

(Continued)

*Primary Examiner* — Luu T Pham
*Assistant Examiner* — Edward X Long
(74) *Attorney, Agent, or Firm* — Scully, Scott, Murphy & Presser, P.C.

(57) ABSTRACT

A terminal device may obtain a third public key of a communication device, in a case where the third public key is obtained, send a third authentication request in which the third public key is used to the communication device, receive a third authentication response from the communication device, and send third connection information to the communication device. The third connection information may include a first identifier and a second identifier, the first identifier for identifying a first wireless network in which a first access point operates as a parent station, and the second identifier for identifying a second wireless network in which a second access point operates as a parent station.

8 Claims, 15 Drawing Sheets

(51) Int. Cl.
  *H04L 9/30*   (2006.01)
  *H04W 12/06*  (2021.01)
  *H04W 76/11*  (2018.01)
  *H04W 80/04*  (2009.01)
  *H04W 84/12*  (2009.01)

(52) U.S. Cl.
  CPC ............ *H04W 76/11* (2018.02); *H04W 80/04* (2013.01); *H04W 84/12* (2013.01)

(56) References Cited

U.S. PATENT DOCUMENTS

| | | |
|---|---|---|
| 2017/0026900 A1 | 1/2017 | Goto |
| 2017/0111783 A1 | 4/2017 | Zhang et al. |
| 2017/0201878 A1 | 7/2017 | Yu et al. |
| 2017/0215066 A1 | 7/2017 | Tachibana |
| 2017/0215070 A1 | 7/2017 | Sakai |
| 2017/0367034 A1 | 12/2017 | Goto |
| 2018/0109381 A1* | 4/2018 | Cammarota ........ H04W 12/041 |
| 2018/0295568 A1 | 10/2018 | Goto |
| 2019/0053137 A1* | 2/2019 | Watanabe ........... H04W 40/244 |
| 2019/0058711 A1* | 2/2019 | Zhu ...................... H04L 67/306 |
| 2020/0015084 A1 | 1/2020 | Sakai |
| 2021/0195410 A1 | 6/2021 | Goto |

OTHER PUBLICATIONS

Jiang, Q., et al., 2019. Shake to communicate: Secure handshake acceleration-based pairing mechanism for wrist worn devices. IEEE Internet of Things Journal, 6(3), pp. 5618-5630. (Year: 2019).*

* cited by examiner (Configuration With AP6)

(Configuration With AP7)

(Authentication With Printer)

NON-TRANSITORY COMPUTER-READABLE MEDIUM STORING COMPUTER-READABLE INSTRUCTIONS FOR TERMINAL DEVICE AND COMMUNICATION DEVICE

CROSS-REFERENCE TO RELATED APPLICATION

This application is a continuation application of U.S. application Ser. No. 18/164,263 filed on Feb. 3, 2023, which is a continuation application of U.S. application Ser. No. 16/740,673 filed on Jan. 13, 2020, now U.S. Pat. No. 11,595,814 issued on Feb. 28, 2023, which claims priority to Japanese Patent Application No. 2019-005470 filed on Jan. 16, 2019, the contents of which are hereby incorporated by reference into the present application.

TECHNICAL FIELD

The present disclosure discloses a technique that establishes a wireless connection between a communication device and an external device by using a terminal device.

DESCRIPTION OF RELATED ART

A DPP (Device Provisioning Protocol) scheme, which is a wireless communication scheme established by the Wi-Fi Alliance, is known. The DPP scheme is a wireless communication scheme for easily establishing a Wi-Fi connection between a pair of devices. For example, a public key is shared between a terminal device operating as an Initiator and an access point (hereinbelow termed "AP") operating as a Responder. Then, in response to communication in which the public key is used being executed between the terminal device and the AP, the terminal device operates as a Configurator and sends connection information for AP, which is for establishing a Wi-Fi connection, to the AP (i.e., an Enrollee). Further, a public key is shared between the terminal device operating as the Initiator and a peripheral device operating as the Responder, and the terminal device operates as the Configurator and sends connection information for device, which is for establishing a Wi-Fi connection, to the peripheral device (i.e., the Enrollee). As a result, in response to communication in which the respective connection information are used being executed between the AP and the peripheral device, a Wi-Fi connection is established between the AP and the peripheral device.

SUMMARY

For example, a situation is assumed in which a user of the terminal device wishes to establish a Wi-Fi connection between the peripheral device and a first AP when the peripheral device is present near the first AP, and wishes to establish a Wi-Fi connection between the peripheral device and a second AP when the peripheral device is present near the second AP. In this case, when the peripheral device is present near the first AP, the user performs an operation for causing the terminal device to send first connection information for AP to the first AP and an operation for causing the terminal device to send first connection information for device to the peripheral device. On the other hand, when the peripheral device is present near the second AP, the user performs an operation for causing the terminal device to send second connection information for AP to the second AP and an operation for causing the terminal device to send second connection information for device to the peripheral device. As such, the user of the terminal device needs to perform many operations.

The present disclosure discloses a technique capable of reducing workload of a user of a terminal device.

A non-transitory computer-readable medium storing computer-readable instructions for a terminal device is disclosed herein. The computer-readable instructions, when executed by a processor of the terminal device, may cause the terminal device to: obtain a first public key which is a public key of a first access point; in a case where the first public key is obtained, send a first authentication request in which the first public key is used to the first access point; in a case where the first authentication request is sent to the first access point, receive a first authentication response, which is a response for the first authentication request, from the first access point; in a case where the first authentication response is received from the first access point, send first connection information to the first access point, the first connection information being for establishing a wireless connection between a communication device and the first access point; obtain a second public key which is a public key of a second access point; in a case where the second public key is obtained, send a second authentication request in which the second public key is used to the second access point; in a case where the second authentication request is sent to the second access point, receive a second authentication response, which is a response for the second authentication request, from the second access point; in a case where the second authentication response is received from the second access point, send second connection information to the second access point, the second connection information being for establishing a wireless connection between the communication device and the second access point; obtain a third public key which is a public key of the communication device; in a case where the third public key is obtained, send a third authentication request in which the third public key is used to the communication device; in a case where the third authentication request is sent to the communication device, receive a third authentication response, which is a response for the third authentication request, from the communication device; and in a case where the third authentication response is received from the communication device, send third connection information to the communication device, the third connection information including a first identifier and a second identifier different from the first identifier, the first identifier being information for identifying a first wireless network in which the first access point operates as a parent station, and the second identifier being information for identifying a second wireless network in which the second access point operates as a parent station.

Moreover, a communication device is disclosed herein. The communication device may comprise a processor; and a memory storing computer-readable instructions therein, wherein the computer-readable instructions, when executed by the processor, cause the communication device to: receive an authentication request in which a public key of the communication device is used from a terminal device; in a case where the authentication request is received from the terminal device, send an authentication response, which is a response for the authentication request, to the terminal device, in a case where the authentication response is sent to the terminal device, receive connection information from the terminal device, the connection information including a first identifier and a second identifier different from the first identifier, the first identifier being information for identifying a first wireless network in which a first access point operates as a parent station, the second identifier being information for identifying a second wireless network in which a second access point operates as a parent station; and in a case where the connection information is received from the terminal device, establish a wireless connection between the communication device and any one of the first access point and the second access point by using the connection information.

The terminal device itself and a computer program for the terminal device are also novel and useful. A computer program for the communication device and a non-transitory computer-readable medium storing this computer program for the communication device are also novel and useful. A method implemented by the terminal device and a method implemented by the communication device are also novel and useful. A communication system comprising the terminal device and the communication device is also novel and useful.

EMBODIMENTS

Figure 1:
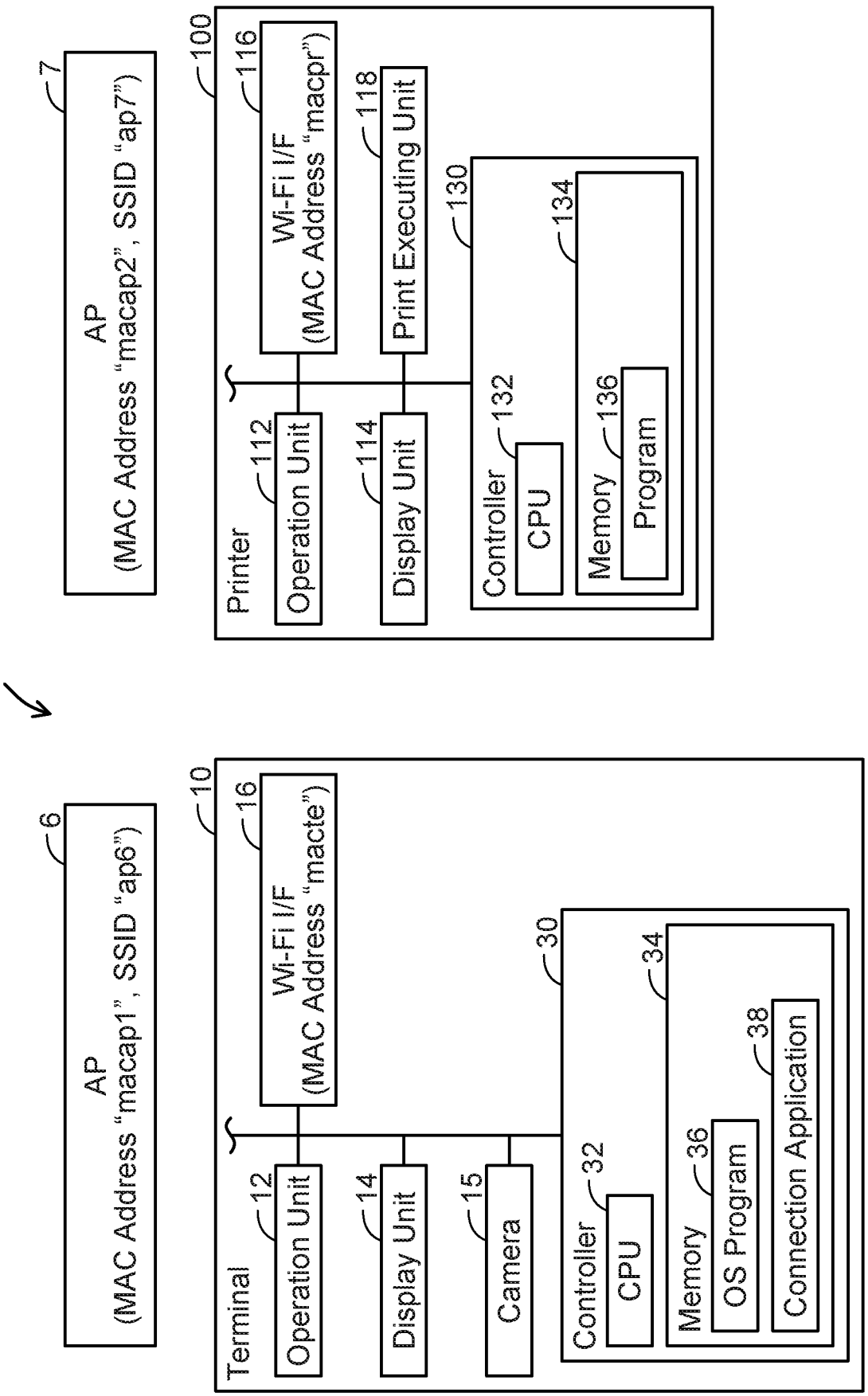
FIG. 1 shows a configuration of a communication system.

Configuration of Communication System 2; FIG. 1)
As shown in FIG. 1, a communication system 2 comprises a plurality of APs (Access Points) 6, 7, a terminal 10, and a printer 100. In this embodiment, a situation is assumed in which the APs 6, 7 are, for example, installed in different rooms in the same company and the printer 100 is a portable small printer. That is, the printer 100 can be moved and may be installed near the AP 6 or may be installed near the AP 7. In such a situation, the present embodiment realizes establishing a wireless connection according to Wi-Fi scheme (hereinbelow termed "Wi-Fi connection") between the printer 100 and the AP 6 when the printer 100 is present near the AP 6, and establishing a Wi-Fi connection between the printer 100 and the AP 7 when the printer 100 is present near the AP 7.

(Configuration of Terminal 10)
The terminal 10 is a portable terminal device such as a cellphone (e.g., a smartphone), a PDA, and a tablet PC. In a variant, the terminal 10 may be a desktop PC, a laptop PC or the like.

The terminal 10 comprises an operation unit 12, a display unit 14, a camera 15, a Wi-Fi interface 16, and a controller 30. The units 12 to 30 are connected to a bus line (reference number omitted). Hereinbelow, an interface will be simply termed "I/F".

The operation unit 12 comprises a plurality of keys. A user can input various instructions to the terminal 10 by operating the operation unit 12. The display unit 14 is a display for displaying various types of information. The display unit 14 also functions as a touch panel (i.e., operation unit) which receives instructions from the user. The camera 15 is a device for capturing images of an object, and in this embodiment, it is especially used to capture QR codes (registered trademark) for the APs 6, 7 and the printer 100.

A MAC address "macte" is assigned to the Wi-Fi I/F 16. The Wi-Fi I/F 16 is a wireless interface configured to execute wireless communication according to the Wi-Fi scheme (hereinbelow termed "Wi-Fi communication"). The Wi-Fi scheme is a wireless communication scheme for executing wireless communication according to 802.11 standard of IEEE (the Institute of Electrical and Electronics Engineers, Inc.) and standards complying thereto (such as 802.11a, 11b, 11g, 11n, 1 lac, etc.). The Wi-Fi I/F 16 especially supports Device Provisioning Protocol (DPP) scheme that has been established by the Wi-Fi Alliance. The DPP scheme is described in the standard "Device Provisioning Protocol Technical Specification Version 1.0" created by the Wi-Fi Alliance, and is a wireless communication scheme for easily establishing a Wi-Fi connection between a pair of devices (such as between the printer 100 and the AP 6 or 7) by using the terminal 10.

The controller 30 comprises a CPU 32 and a memory 34. The CPU 32 executes various processes in accordance with programs 36, 38 stored in the memory 34. The memory 34 is constituted of a volatile memory, a non-volatile memory and the like, and stores the OS program 36 and the connection application 38 (hereinbelow simply termed "the app 38").

The OS program 36 is a program for controlling basic operations of the terminal 10. The app 38 is a program for establishing a Wi-Fi connection between a pair of devices according to the DPP scheme. The app 38 is installed in the terminal 10, for example, from a server on the Internet provided by a vendor of the printer 100.

(Configuration of Printer 100)
The printer 100 is a peripheral device (e.g., a peripheral device of the terminal 10, etc.) capable of executing a print function. The printer 100 comprises an operation unit 112, a display unit 114, a Wi-Fi I/F 116, a print executing unit 118, and a controller 130. The units 112 to 130 are connected to a bus line (reference number omitted).

The operation unit 112 comprises a plurality of keys. The user can input various instructions to the printer 100 by operating the operation unit 112. The display unit 114 is a display for displaying various types of information. The display unit 114 also functions as a touch panel (i.e., operation unit) which receives instructions from the user. The Wi-Fi I/F 116 is the same as the Wi-Fi I/F 16 of the terminal 10. That is, the Wi-Fi I/F 116 supports the DPP scheme. Further, a MAC address "macpr" is assigned to the Wi-Fi I/F 116. The print executing unit 118 comprises a printing mechanism of ink jet scheme, laser scheme, or the like.

The controller 130 comprises a CPU 132 and a memory 134. The CPU 132 executes various processes in accordance with a program 136 stored in the memory 134. The memory 134 is constituted of a volatile memory, a non-volatile memory, and the like.

Figure 2:
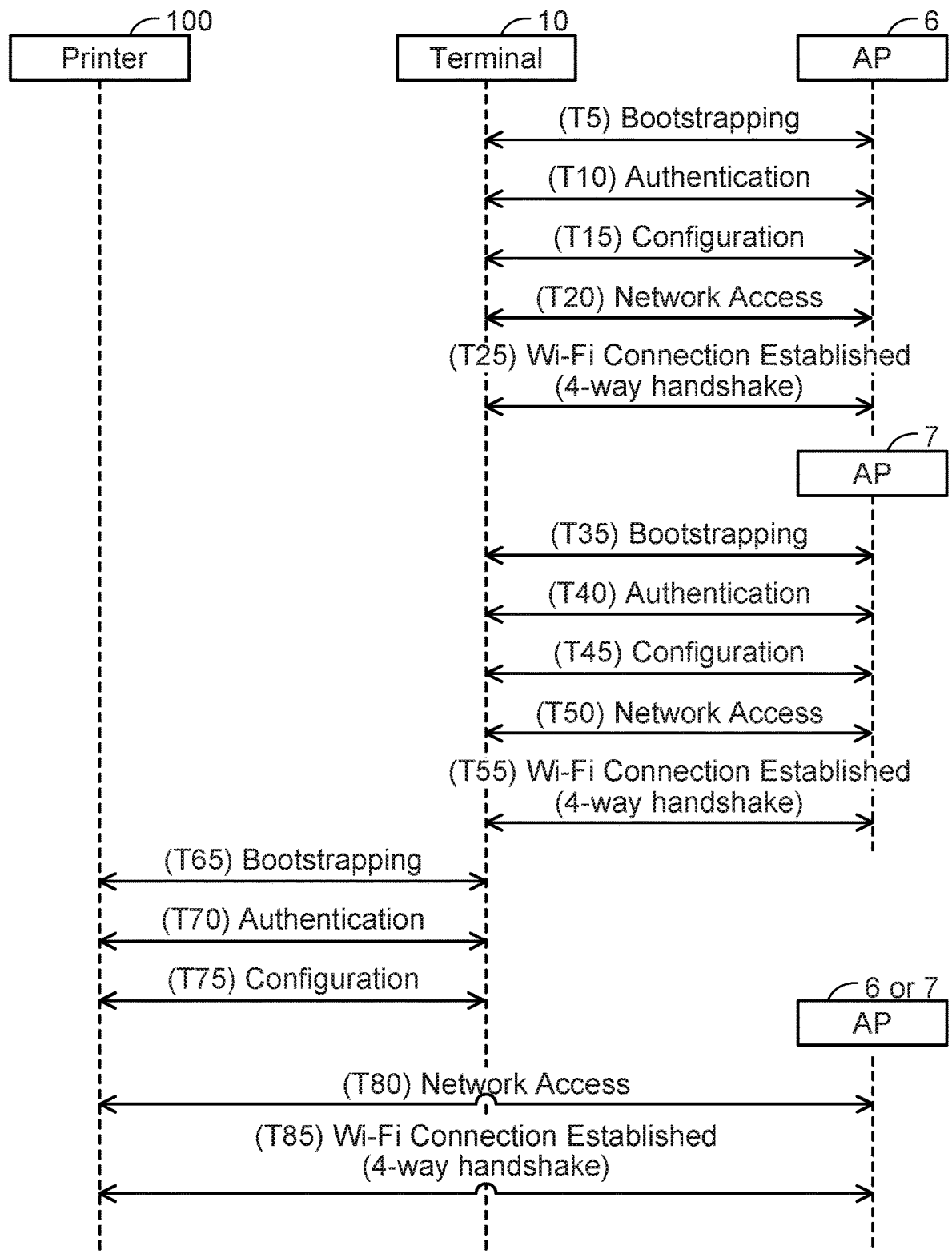
FIG. 2 shows an explanatory diagram for explaining an outline of an embodiment.

Outline of Present Embodiment; FIG. 2

Next, an outline of the present embodiment will be described with reference to FIG. 2. As described above, the terminal 10 and the printer 100 support the DPP scheme. In addition, the APs 6, 7 also support the DPP scheme. Further, MAC addresses "macap1" and "macap2" are assigned respectively to the APs 6 and 7. In this embodiment, establishment of a Wi-Fi connection between the printer 100 and the AP 6 or the AP 7 is realized by the devices 6, 7, 10, 100 executing communication according to the DPP scheme. Hereinbelow, to facilitate understanding, operations which the CPUs (e.g., the CPU 32, the CPU 132) of the respective devices execute will be described with the devices (e.g., the terminal 10, the printer 100) as subjects of action instead of describing the operations with the CPUs as the subjects of action.

In T5, the terminal 10 executes Bootstrapping (hereinbelow simply termed "BS") according to the DPP scheme with the AP 6. The BS is a process of providing, from the AP 6 to the terminal 10, information that is used in Authentication (hereinbelow simply termed "Auth") of T10 to be described later in response to a QR code adhered to the AP 6 being captured by the terminal 10.

In T10, the terminal 10 executes the Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow simply termed "Config") according to the DPP scheme with the AP 6. This Config is a process of sending, to the AP 6, information for the AP 6 to establish a Wi-Fi connection. Specifically, the terminal 10 creates a first Configuration Object for AP (hereinbelow, Configuration Object will be simply termed "CO"), and sends the first CO for AP to the AP 6. As a result, the first CO for AP is stored in the AP 6.

In T20, the terminal 10 executes Network Access (hereinbelow simply termed "NA") according to the DPP scheme with the AP 6. In this NA, the terminal 10 creates a first CO for terminal and stores it in the memory 34. Then, the terminal 10 and the AP 6 use the first CO for terminal and the first CO for AP to share a connection key for establishing a Wi-Fi connection between the terminal 10 and the AP 6.

In T25, the terminal 10 and the AP 6 execute communication of 4way-handshake. During at least a part of the communication of 4way-handshake, the terminal 10 and the AP 6 communicate encrypted information that is encrypted by the connection key shared in the NA of T20. Then, in a case where the encrypted information is successfully decrypted, a Wi-Fi connection is established between the terminal 10 and the AP 6. Thereby, the terminal 10 participates, as a child station, in a wireless network formed by the AP 6. In this case, the terminal 10 stores a Service Set Identifier (SSID) "ap6" for identifying the AP6 in the memory 34. In a variant, communication of SAE (Simultaneous Authentication of Equals, commonly called "Dragonfly") may be used instead of the communication of 4way-handshake.

Next, in T35, the terminal 10 executes BS according to the DPP scheme with the AP 7. This BS is a process of providing, from the AP 7 to the terminal 10, information that is used in Auth of T40 to be described later in response to a QR code adhered to the AP 7 being captured by the terminal 10.

In T40, the terminal 10 executes the Auth according to the DPP scheme with the AP 7 by using the information obtained in the BS of T35. This Auth is a process for the terminal 10 and the AP 7 to authenticate their communication counterparts.

In T45, the terminal 10 executes Config according to the DPP scheme with the AP 7. This Config is a process of sending, to the AP 7, information for the AP 7 to establish a Wi-Fi connection. Specifically, the terminal 10 creates a second CO for AP and sends the second CO for AP to the AP 7. As a result, the second CO for AP is stored in the AP 7.

In T50, the terminal 10 executes NA according to the DPP scheme with the AP 7. In this NA, the terminal 10 creates a second CO for terminal and stores it in the memory 34. Then, the terminal 10 and the AP 7 use the second CO for terminal and the second CO for AP to share a connection key for establishing a Wi-Fi connection between the terminal 10 and the AP 7.

In T55, the terminal 10 and the AP 7 execute communication of 4way-handshake. During at least a part of the communication of 4way-handshake, the terminal 10 and the AP 7 communicate encrypted information that is encrypted by the connection key shared in the NA of T50. Then, in a case where the encrypted information is successfully decrypted, a Wi-Fi connection is established between the terminal 10 and the AP 7. Thereby, the terminal 10 participates, as a child station, in a wireless network formed by the AP 7. In this case, the terminal 10 stores an SSID "ap7" for identifying the AP 7 in the memory 34. In a variant, communication of SAE may be used instead of the communication of 4way-handshake.

Next, in T65, the terminal 10 executes BS according to the DPP scheme with the printer 100. The BS is a process of providing, from the printer 100 to the terminal 10, information that is used in Auth of T70 to be described later in response to a QR code displayed on the printer 100 being captured by the terminal 10.

In T70, the terminal 10 executes Auth according to the DPP scheme with the printer 100 by using the information obtained in the BS of T65. This Auth is a process for the terminal 10 and the printer 100 to authenticate their communication counterparts.

In T75, the terminal 10 executes Config according to the DPP scheme with the printer 100. This Config is a process of sending, to the printer 100, information for the printer 100 to establish a Wi-Fi connection. Specifically, the terminal 10 creates a CO for printer and sends the CO for printer to the printer 100. As a result, the CO for printer is stored in the printer 100.

In T80, the printer 100 and the AP 6 or the AP 7 execute NA according to the DPP scheme. Specifically, when the printer 100 is present near the AP 6, the printer 100 and the AP 6 execute NA according to the DPP scheme by using the CO for printer and the first CO for AP. When the printer 100 is present near the AP 7, the printer 100 and the AP 7 execute NA according to the DPP scheme by using the CO for printer and the second CO for AP. This NA is a process for the printer 100 and the AP 6 or the AP 7 to share a connection key for establishing a Wi-Fi connection between the printer 100 and the AP 6 or the AP 7.

In T85, the printer 100 and the AP 6 or the AP 7 execute communication of 4way-handshake. During at least a part of the communication of 4way-handshake, the printer 100 and the AP 6 or the AP 7 communicate encrypted information that is encrypted by the connection key shared in the NA of T80. Then, in a case where the encrypted information is successfully decrypted, a Wi-Fi connection is established between the printer 100 and the AP 6 or the AP 7. Thereby, the printer 100 participates, as a child station, in the wireless network formed by the AP 6 or the AP 7.

In the DPP scheme, the user does not need to input information (e.g., SSID, password, etc.) of the wireless network in which the AP 6 or the AP 7 operates as a parent station to the printer 100 in order to establish a Wi-Fi connection between the printer 100 and the AP 6 or the AP 7. Therefore, the user can easily establish a Wi-Fi connection between the printer 100 and the AP 6 or the AP 7.

Figure 3:
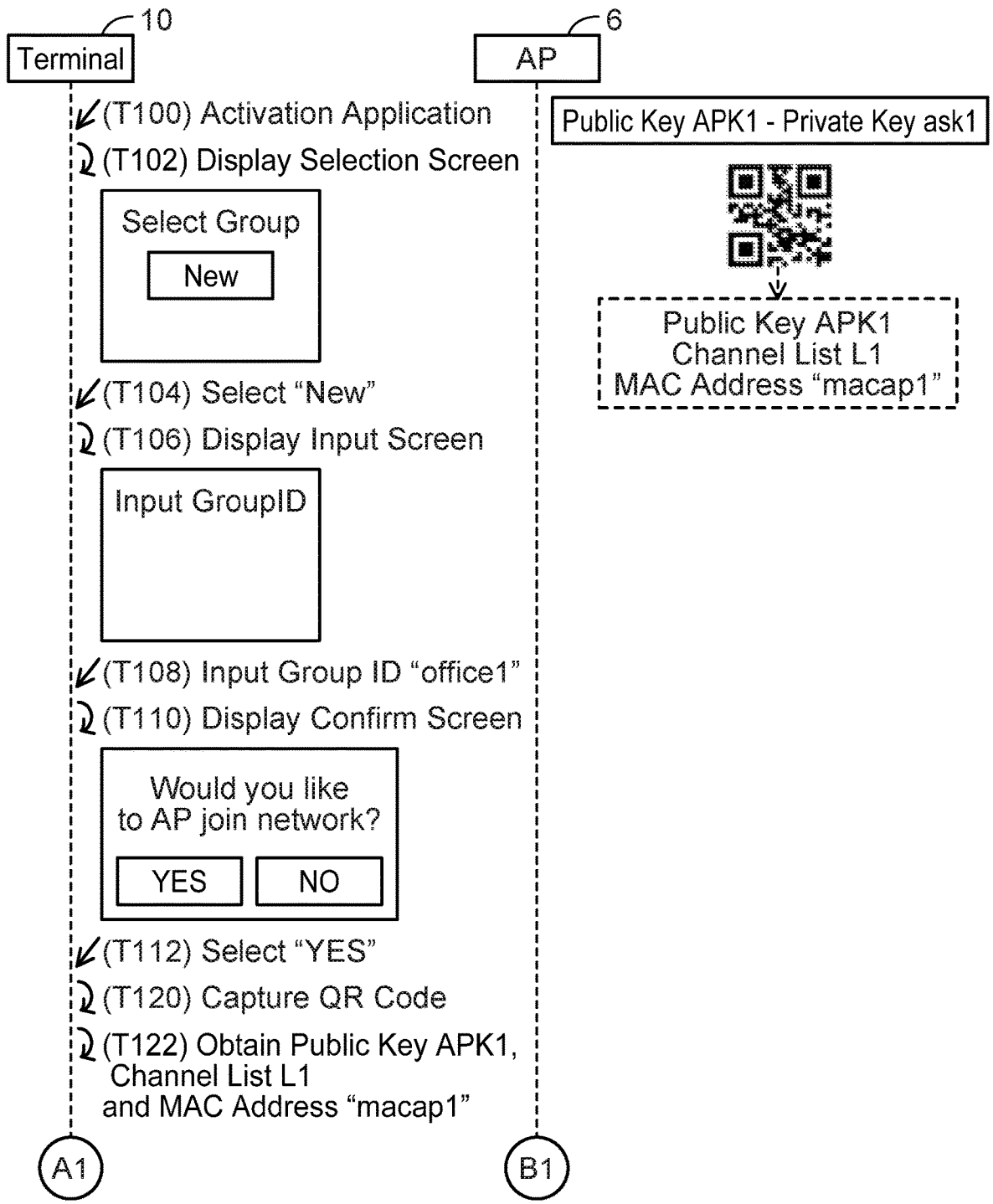
FIG. 3 shows a sequence diagram of a Bootstrapping process with an AP.

(Bootstrapping (BS) with AP 6; FIG. 3)

Next, processes executed in T5 to T20, T35 to T50, and T65 to T80 of FIG. 2 will be described in detail with reference to FIG. 3 to FIG. 14. Firstly, the BS process executed between the terminal 10 and the AP 6 in T5 of FIG. 2 will be described with reference to FIG. 3. In an initial state of FIG. 3, the AP 6 stores in advance a public key APK1 and a private key ask1 of the AP 6. Further, the QR code which is obtained by coding the public key APK1 of the AP 6, a channel list L1 of the AP 6, and the MAC address "macap1" of the AP 6, is adhered to a housing of the AP 6. The channel list L1 is a list of a plurality of communication channels to be used in Auth (see T10 of FIG. 2) (i.e., a plurality of communication channels that the AP 6 can use).

In T100, the terminal 10 activates the app 38 in response to receiving an activation operation for the app 38 from the user. The subsequent processes executed by the terminal 10 are realized by the app 38. Next, in T102, the terminal 10 causes the display unit 14 to display a selection screen. This selection screen includes a "New" button indicating that the terminal 10 is to establish a new Wi-Fi connection.

In response to the "New" button in the selection screen being selected by the user in T104, the terminal 10 causes the display unit 14 to display an input screen for inputting a group ID on the display unit 14 in T106. The group ID is information for identifying a wireless network that is formed by the terminal 10 establishing a new Wi-Fi connection.

In response to a group ID "office1", which is an arbitrary character string designated by the user, being inputted in T108, the terminal 10 causes the display unit 14 to display, in T110, a confirmation screen for the user to confirm whether to execute establishment of a Wi-Fi connection with the AP 6. The confirmation screen includes a YES button indicating that establishment of a Wi-Fi connection with the AP 6 is to be executed, and a NO button indicating that establishment of a Wi-Fi connection with the AP 6 is not to be executed.

In response to the YES button in the confirmation screen being selected by the user in T112, the terminal 10 activates the camera 15 and uses the camera 15 to capture the QR code adhered to the housing of the AP 6 in T120. Then, in T122, the terminal 10 decodes the captured QR code to obtain the public key APK1, the channel list L1, and the MAC address "macap 1". When the process of T122 completes, the process of FIG. 3 ends.

Figure 4:
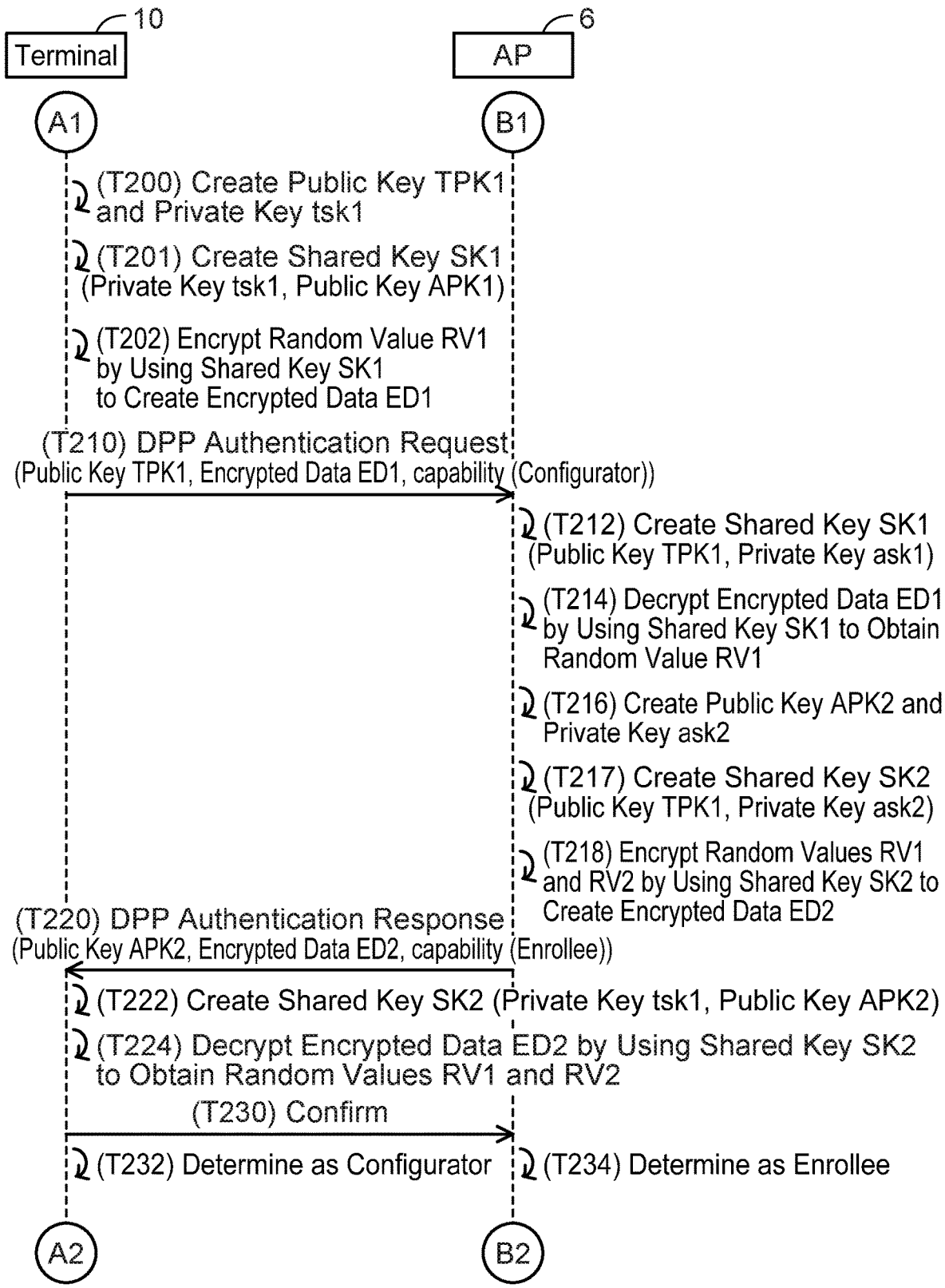
FIG. 4 shows a sequence diagram of an Authentication process with the AP.

(Authentication (Auth) with the AP 6; FIG. 4)

Next, the Auth process executed between the terminal 10 and the AP 6 in T10 of FIG. 2 will be described with reference to FIG. 4.

In T200, the terminal 10 creates a public key TPK1 and a private key tsk1 of the terminal 10. Next, in T201, the terminal 10 creates a shared key SK1 according to ECDH (Elliptic curve Diffie-Hellman key exchange) by using the created private key tsk1 and the public key APK1 of the AP 6 obtained in T122 of FIG. 3. Then, in T202, the terminal 10 encrypts a random value RV1 by using the created shared key SK1 to create encrypted data ED1.

In T210, the terminal 10 sends a DPP Authentication Request (hereinbelow simply termed "AReq") to the AP 6 via the Wi-Fi I/F 16 with the MAC address "macap1" obtained in T122 of FIG. 3 as its destination. The AReq is a signal requesting the AP 6 to execute authentication, and includes the public key TPK1 of the terminal 10 created in T200, the encrypted data ED1 created in T202, and a capability of the terminal 10. Here, the terminal 10 repeatedly sends the AReq to the AP 6 by sequentially using the plurality of communication channels in the channel list L1 obtained in T122 of FIG. 3.

A capability is information that is pre-designated in a device supporting the DPP scheme and includes a value which is one of: a value indicating that the device is capable of operating only as a Configurator according to the DPP scheme, a value indicating that the device is capable of operating only as an Enrollee according to the DPP scheme, and a value indicating that the device is capable of operating as both the Configurator and the Enrollee. The Configurator refers to a device configured to send a CO that is to be used in NA (e.g., T20 of FIG. 2) to the Enrollee in Config (e.g., T15 of FIG. 2). On the other hand, the Enrollee refers to a device that receives the CO that is to be used in the NA from the Configurator in the Config. As described above, in this embodiment, the terminal 10 creates the first CO for AP, the second CO for AP and the CO for printer and sends them respectively to the AP 6, the AP 7 and the printer 100. As such, the capability of the terminal 10 includes the value indicating that it is capable of operating only as the Configurator.

In T210, the AP 6 receives the AReq from the terminal 10. As described above, this AReq is sent with the MAC address "macap1" of the AP 6 as the destination. Therefore, the AP 6 can appropriately receive this AReq from the terminal 10. Further, the AP 6 is brought into a state of monitoring that the AReq is received by using one communication channel among the plurality of communication channels in the channel list L1 (i.e., the plurality of communication channels that the AP 6 can use). As described above, the AReq of T210 is sent by sequentially using the plurality of communication channels in the channel list L1. Therefore, the AP 6 can appropriately receive this AReq from the terminal 10.

Next, the AP 6 executes the following process for authenticating the sender of the AReq (i.e., the terminal 10). Specifically, in T212, the AP 6 creates a shared key SK1 according to the ECDH by using the public key TPK1 of the terminal 10 in the AReq and the private key ask1 of the AP 6. Here, the shared key SK1 created by the terminal 10 in T201 is the same as the shared key SK1 created by the AP 6 in T212. Therefore, in T214, the AP 6 can appropriately decrypt the encrypted data ED1 in the AReq by using the created shared key SK1, as a result of which the AP 6 can obtain the random value RV1. In a case where the decryption of the encrypted data ED1 succeeds, the AP 6 determines that the sender of the AReq is the device that captured the QR code of the AP 6, that is, determines that the authentication has succeeded, and executes processes from T216 onward. On the other hand, in a case where the decryption of the encrypted data ED1 does not succeed, the AP 6 determines that the sender of the AReq is not the device that captured the QR code of the AP 6, that is, determines that the authentication has failed, and does not execute the processes from T216 onward.

In T216, the AP 6 creates a new public key APK2 and a new private key ask2 of the AP 6. In a variant, the AP 6 may store the public key APK2 and the private key ask2 in advance. Next, in T217, the AP 6 creates a shared key SK2 according to the ECDH by using the public key TPK1 of the terminal 10 in the AReq of T210 and the created private key ask2 of the AP 6. Then, in T218, the AP 6 encrypts the obtained random value RV1 and a new random value RV2 by using the created shared key SK2 to create encrypted data ED2.

In T220, the AP 6 sends a DPP Authentication Response (hereinbelow simply termed "ARes") to the terminal 10. This ARes includes the public key APK2 of the AP 6 created in T216, the encrypted data ED2 created in T218, and a capability of the AP 6. This capability includes the value indicating that the AP 6 is capable of operating only as the Enrollee.

In T220, the terminal 10 executes the following process for authenticating the sender of this ARes (i.e., the AP 6) in response to receiving the ARes from the AP 6 via the Wi-Fi I/F 16. Specifically, in T222, the terminal 10 creates a shared key SK2 according to the ECDH by using the private key tsk1 of the terminal 10 created in T200 and the public key APK2 of the AP 6 in the ARes. Here, the shared key SK2 created by the AP 6 in T217 is the same as the shared key SK2 created by the terminal 10 in T222. Therefore, in T224, the terminal 10 can appropriately decrypt the encrypted data ED2 in the ARes by using the created shared key SK2, as a result of which the terminal 10 can obtain the random values RV1 and RV2. In a case where the decryption of the encrypted data ED2 succeeds, the terminal 10 determines that the sender of the ARes is the device having the captured QR code, that is, determines that the authentication has succeeded, and executes processes from T230 onward. On the other hand, in a case where the decryption of the encrypted data ED2 does not succeed, the terminal 10 determines that the sender of the ARes is not the device having the captured QR code, that is, determines that the authentication has failed, and does not execute the processes from T230 onward.

In T230, the terminal 10 sends Confirm to the AP 6 via the Wi-Fi I/F 16. The Confirm includes information indicating that the terminal 10 operates as the Configurator and the AP 6 operates as the Enrollee. As a result, the terminal 10 determines to operate as the Configurator in T232, and the AP 6 determines to operate as the Enrollee in T234. When the process of T234 completes, the process of FIG. 4 ends. When the process of FIG. 4 ends, the terminal 10 discards the public key TPK1 and the private key tsk1 (i.e., deletes them from the memory 34).

Figure 5:
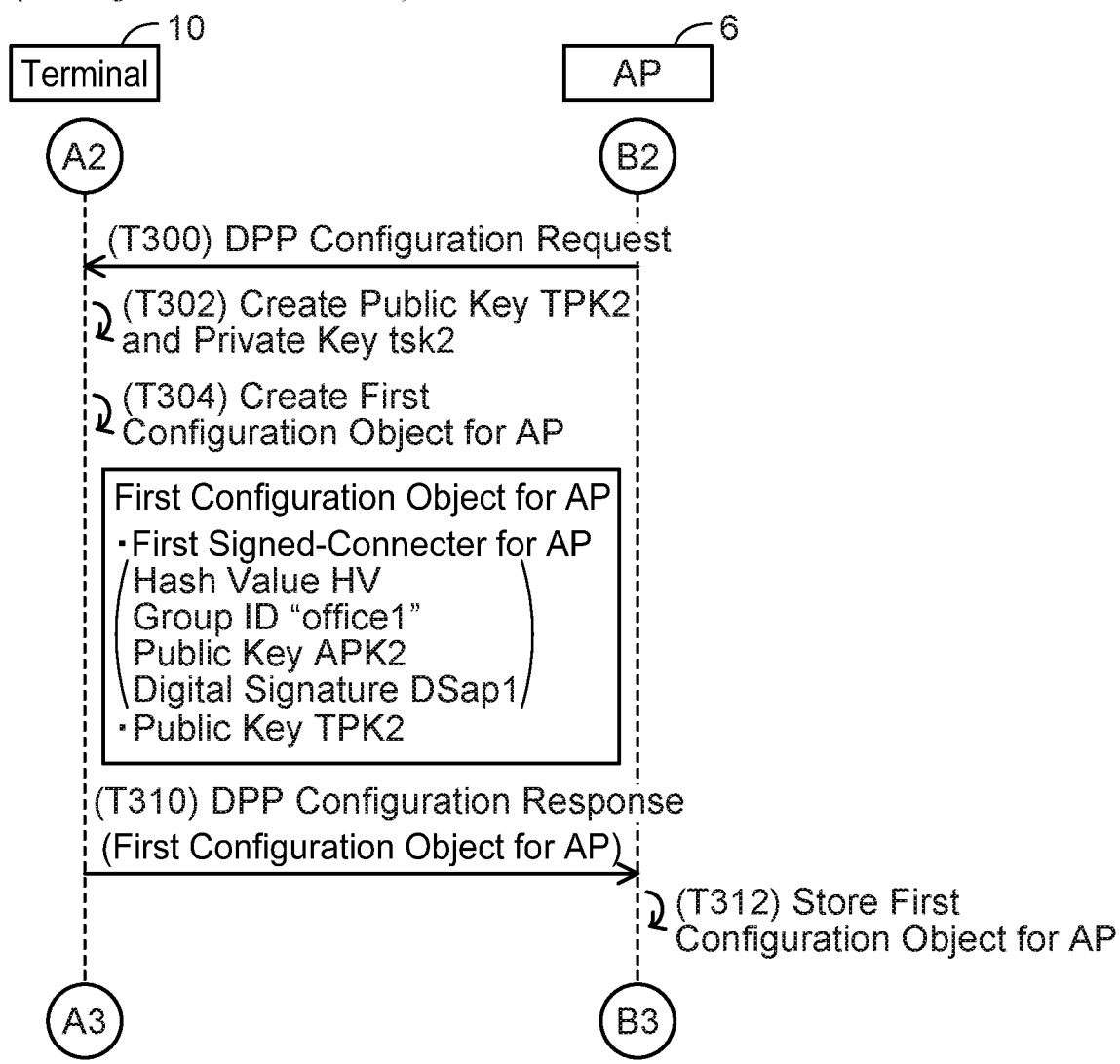
FIG. 5 shows a sequence diagram of a Configuration process with the AP.

(Configuration (Config) with AP 6; FIG. 5)

Next, the Config process executed between the terminal 10 and the AP 6 in T15 of FIG. 2 will be described with reference to FIG. 5.

In T300, the AP 6 sends a DPP Configuration Request (hereinbelow simply termed "CReq") to the terminal 10. This CReq is a signal requesting a CO for AP to be sent.

In T300, the terminal 10 receives the CReq from the AP 6 via the Wi-Fi I/F 16. In this case, in T302, the terminal 10 creates a new public key TPK2 and a new private key tsk2 of the terminal 10 and stores them in the memory 34. Next, in T304, the terminal 10 creates a first CO for AP by using the created private key tsk2. Specifically, the terminal 10 executes the following processes.

The terminal 10 firstly creates a hash value HV by hashing the public key TPK2 of the terminal 10. Further, the terminal 10 creates a first value by hashing a combination of the hash value HV, the group ID "office1" inputted in T108 of FIG. 3, and the public key APK2 of the AP 6 in the ARes of T220 of FIG. 4. Then, the terminal 10 creates a digital signature DSap1 according to ECDSA (Elliptic Curve Digital Signature Algorithm) by encrypting the created first value by using the private key tsk2 of the terminal 10. As a result, the terminal 10 can create a first Signed-Connector for AP (hereinbelow, Signed-Connector will be simply termed "SC") including the hash value HV, the group ID "office1", the public key APK2 of the AP 6, and the digital signature DSap1. Then, the terminal 10 creates a first CO for AP including the first SC for AP and the public key TPK2 of the terminal 10.

In T310, the terminal 10 sends a DPP Configuration Response (hereinbelow simply termed "CRes") including the first CO for AP to the AP 6 via the Wi-Fi I/F 16.

In T310, the AP 6 receives the CRes from the terminal 10. In this case, in T312, the AP 6 stores the first CO for AP in this CRes. When the process of T312 completes, the process of FIG. 5 ends.

Figure 6:
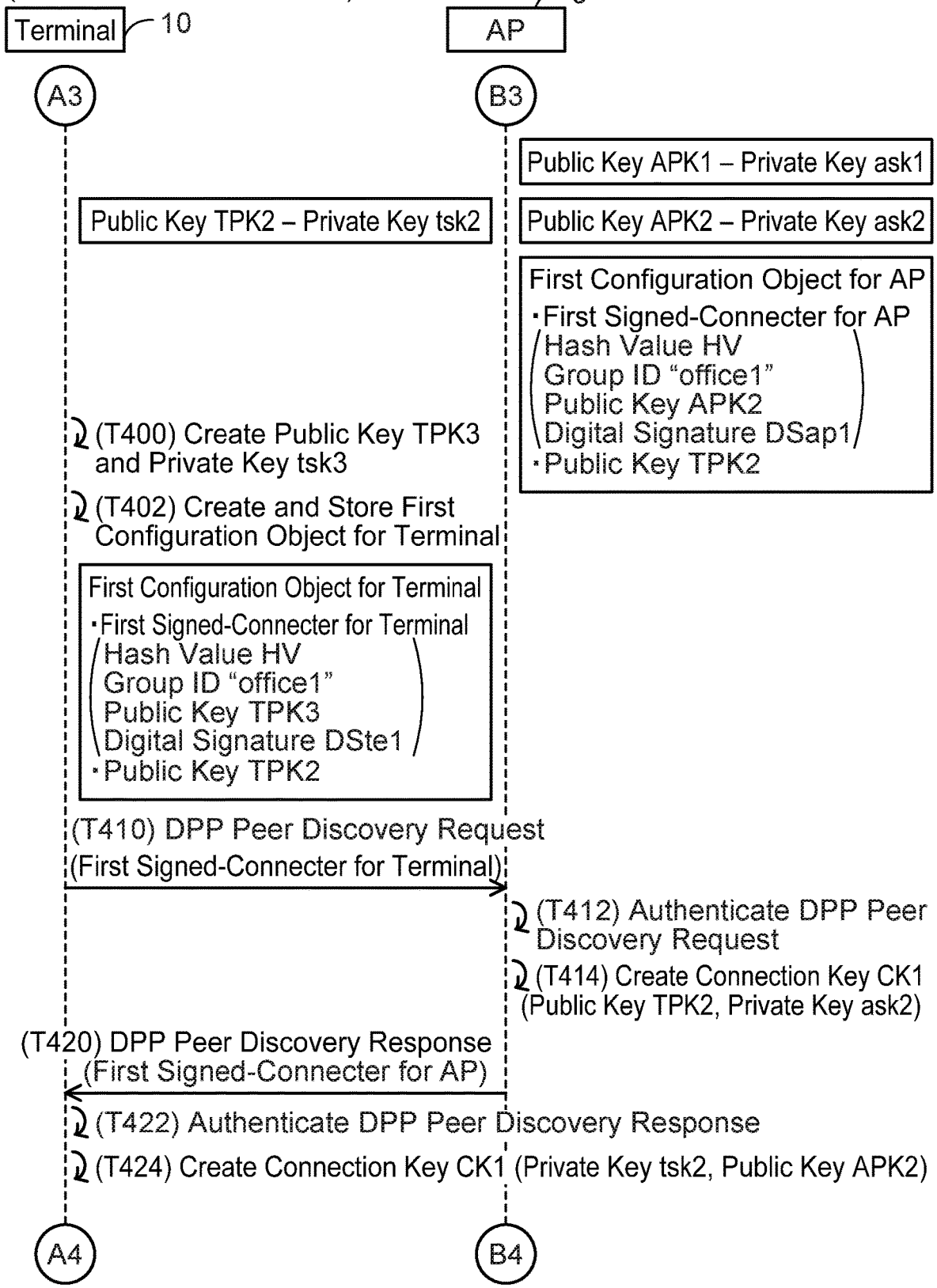
FIG. 6 shows a sequence diagram of a Network Access process with the AP.

(Network Access (NA) with AP 6; FIG. 6)

Next, the NA process executed between the terminal 10 and the AP 6 in T20 of FIG. 2 will be described with reference to FIG. 6.

In T400, the terminal 10 creates a new public key TPK3 and a private key tsk3 of the terminal 10. Next, in T402, the terminal 10 creates a first CO for terminal by using the private key tsk2 of the terminal 10 stored in the memory 34 in T302 of FIG. 5. Specifically, the terminal 10 executes the following processes.

First, the terminal 10 creates a hash value HV by hashing the public key TPK2 of the terminal 10. Further, the terminal 10 creates a second value by hashing a combination of the hash value HV, the group ID "office1" inputted in T108 of FIG. 3, and the public key TPK3 of the terminal 10 created in T400. Then, the terminal 10 creates a digital signature DSte1 according to the ECDSA by encrypting the created second value by using the private key tsk2 of the terminal 10. As a result, the terminal 10 can create a first SC for terminal including the hash value HV, the group ID "office1", the public key TPK3 of the terminal 10, and the digital signature DSte1. The hash value HV and the group ID "office1" included in the first SC for terminal are respectively the same as the hash value HV and the group ID "office1" included in the first SC for AP. The public key TPK3 and the digital signature DSte1 included in the first SC for terminal are respectively different from the public key APK2 and the digital signature DSap1 included in the first SC for AP. Then, the terminal 10 creates a first CO for terminal including the first SC for terminal and the public key TPK2 of the terminal 10 stored in the memory 34 in T302 of FIG. 5, and stores it in the memory 34.

In T410, the terminal 10 sends a DPP Peer Discovery Request (hereinbelow simply termed "DReq") including the first SC for terminal to the AP 6 via the Wi-Fi I/F 16. This DReq is a signal requesting the AP 6 to execute authentication and to send the first SC for AP.

In response to receiving the DReq from the terminal 10 in T410, the AP 6 executes a process for authenticating the sender of the DReq (i.e., the terminal 10) and the respective information in the DReq (i.e., the hash value HV, "office1", and the public key TPK3). Specifically, in T412, the AP 6 firstly executes a first AP determination process related to whether the hash value HV and the group ID "office1" in the first SC for terminal respectively match the hash value HV and the group ID "office1" in the first SC for AP. In the case of FIG. 6, the AP 6 determines "matching" in the first AP determination process, thus the AP 6 determines that the authentication for the sender of the DReq (i.e., the terminal 10) has succeeded. Here, determining "matching" in the first AP determination process means that the first SC for terminal and the first SC for AP were created by the same device (i.e., the terminal 10). Consequently, the AP 6 also determines that authentication for the creator of the first SC for terminal (i.e., the terminal 10) has also succeeded. Further, the AP 6 decrypts the digital signature DSte1 in the first SC for terminal by using the public key TPK2 of the terminal 10 included in the first CO for AP. In the case of FIG. 6, the decryption of the digital signature DSte1 succeeds, and then the AP 6 executes a second AP determination process related to whether the second value obtained by decrypting the digital signature DSte1 matches a value obtained by hashing the respective information in the first SC for terminal (i.e., the hash value HV, "office1", and the public key TPK3). In the case of FIG. 6, the AP 6 determines "matching" in the second AP determination process, thus the AP 6 determines that the authentication for the respective information in the DReq has succeeded and executes processes from T414 onward. Here, determining "matching" in the second AP determination process means that the respective information in the first SC for terminal have not been falsified by a third party after the first CO for terminal had been stored in the terminal 10. Authentication using a digital signature, which will be described later, is also a process for confirming that information has not been falsified by a third party. On the other hand, in a case where "not matching" is determined in the first AP determination process, in a case where the decryption of the digital signature DSte1 fails, or in a case where "not matching" is determined in the second AP determination process, the AP 6 determines that the authentication has failed and does not execute the processes from T414 onward.

Next, in T414, the AP 6 creates a connection key (i.e., shared key) CK1 according to the ECDH by using the public key TPK2 of the terminal 10 included in the first CO for AP and the private key ask2 of the AP 6.

In T420, the AP 6 sends a DPP Peer Discovery Response (hereinbelow simply termed "DRes") including the first SC for AP to the terminal 10.

In response to receiving the DRes from the AP 6 via the Wi-Fi I/F 16 in T420, the terminal 10 executes a process for authenticating the sender of the DRes (i.e., the AP 6) and the respective information (i.e., the hash value HV, "office1", and the public key APK2) in the DRes. Specifically, in T422, the terminal 10 firstly executes a first TE determination process related to whether the hash value HV and the group ID "office1" in the first SC for AP respectively match the hash value HV and the group ID "office1" in the first SC for terminal. In the case of FIG. 6, the terminal 10 determines "matching" in the first TE determination process, thus the terminal 10 determines that the authentication for the sender of the DRes (i.e., the AP 6) has succeeded. Here, determining "matching" in the first TE determination process means that the first SC for terminal and the first SC for AP were created by the same device (i.e., the terminal 10). Consequently, the terminal 10 also determines that authentication for the creator of the first SC for terminal (i.e., the terminal 10) has also succeeded. Further, the terminal 10 decrypts the digital signature DSap1 in the first SC for AP by using the public key TPK2 of the terminal 10 included in the first CO for terminal. In the case of FIG. 6, the decryption of the digital signature DSap1 succeeds, and then the terminal 10 executes a second TE determination process related to whether the first value obtained by decrypting the digital signature DSap1 matches a value obtained by hashing the respective information in the first SC for AP (i.e., the hash value HV, "office1", and the public key APK2). In the case of FIG. 6, the terminal 10 determines "matching" in the second TE determination process, thus the terminal 10 determines that the authentication for the respective information in the DRes has succeeded and executes the processes from T424 onward. On the other hand, in a case where "not matching" is determined in the first TE determination process, in a case where the decryption of the digital signature DSap1 fails, or in a case where "not matching" is determined in the second TE determination process, the terminal 10 determines that the authentication has failed and does not execute the processes from T424 onward.

In T424, the terminal 10 creates a connection key CK1 according to the ECDH by using the private key tsk2 of the terminal 10 and the public key APK2 of the AP 6 in the first SC for AP. Here, the connection key CK1 created by the AP 6 in T414 is the same as the connection key CK1 created by the terminal 10 in T424. Thereby, the connection key CK1 for establishing a Wi-Fi connection is shared between the terminal 10 and the AP 6. When T424 completes, the process of FIG. 6 ends.

As described above, after the connection key CK1 has been shared between the terminal 10 and the AP 6, the terminal 10 and the AP 6 execute the communication of 4way-handshake by using the connection key CK1 in T25 of FIG. 2. As a result, a Wi-Fi connection is established between the terminal 10 and the AP 6. Thereby, the terminal 10 participates, as a child station, in a wireless network in which the AP 6 operates as a parent station and which is identified by the group ID "office1". In the case where the Wi-Fi connection is established with the AP 6, the terminal 10 stores the SSID "ap6" of the AP 6 in the memory 34 in association with the first CO for terminal.

Figure 7:
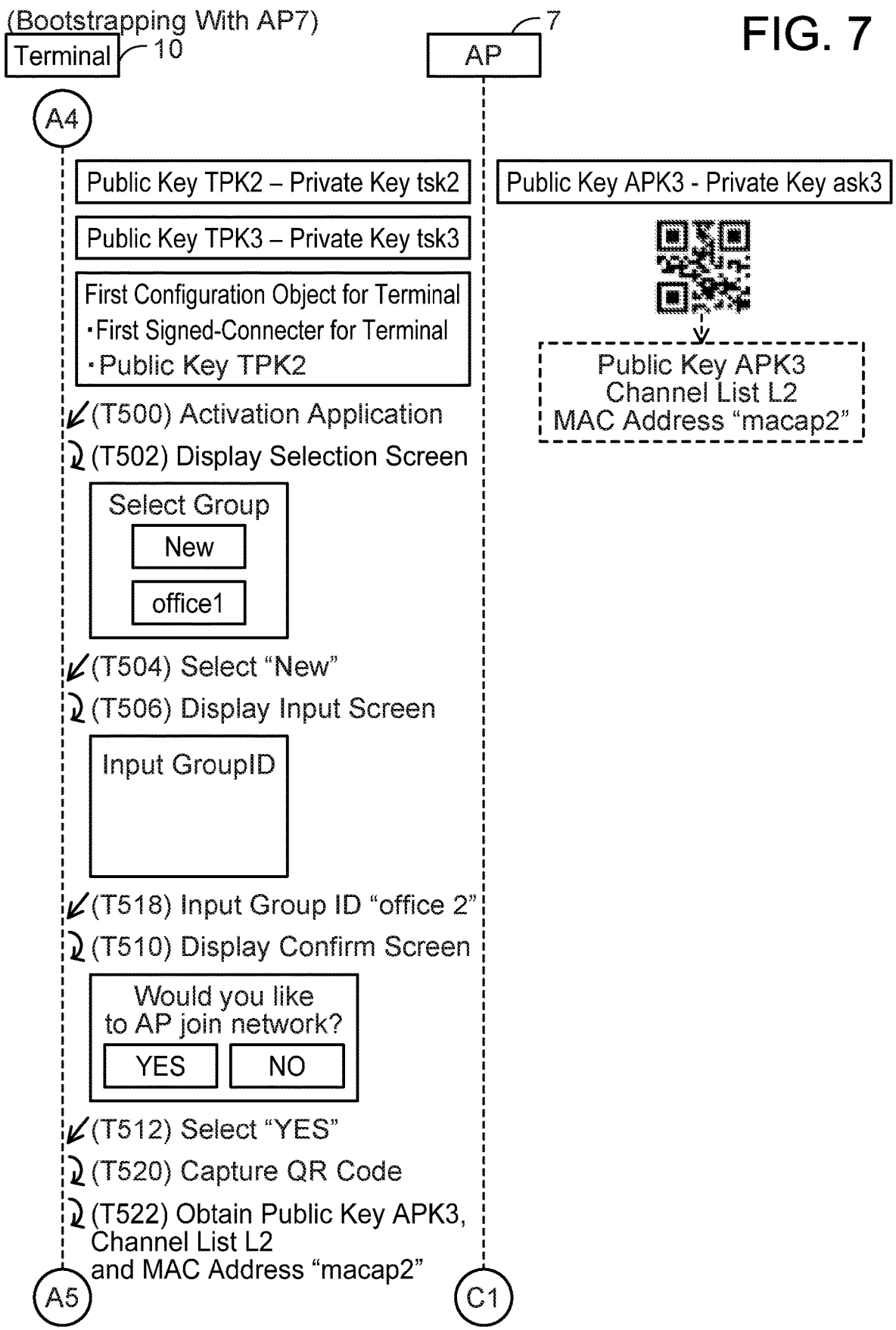
FIG. 7 shows a sequence diagram of a Bootstrapping process with another AP.

(Bootstrapping (BS) with AP 7; FIG. 7)

Next, the BS process executed between the terminal 10 and the AP 7 in T35 of FIG. 2 will be described with reference to FIG. 7. In an initial state of FIG. 7, the terminal 10 already stores in the memory 34, the public key TPK2 and the private key tsk2 (see T302 of FIG. 5), the public key TPK3 and the private key tsk3 (see T400 of FIG. 6), and the first CO for terminal (see T402) of the terminal 10. Further, the AP 7 stores in advance a public key APK3 and a private key ask3 of the AP 7. Further, the QR code which is obtained by coding the public key APK3 of the AP 7, a channel list L2 of the AP 7, and the MAC address "macap2" of the AP 7, is adhered to a housing of the AP 7. The channel list L2 is a list of a plurality of communication channels to be used in Auth (see T40 of FIG. 2) (i.e., a plurality of communication channels that the AP 7 can use).

T500 is the same as T100 of FIG. 3. The subsequent processes executed by the terminal 10 are realized by the app 38. In T502, the terminal 10 displays a selection screen on the display unit 14. Specifically, the terminal 10 firstly obtains the group ID "office1" included in the first SC for terminal in the first CO for terminal stored in the memory 34. In this case, the terminal 10 causes the display unit 14 to display a selection screen that includes an "office1" button having the same character string as the obtained group ID "office1", in addition to the "New" button.

Figure 8:
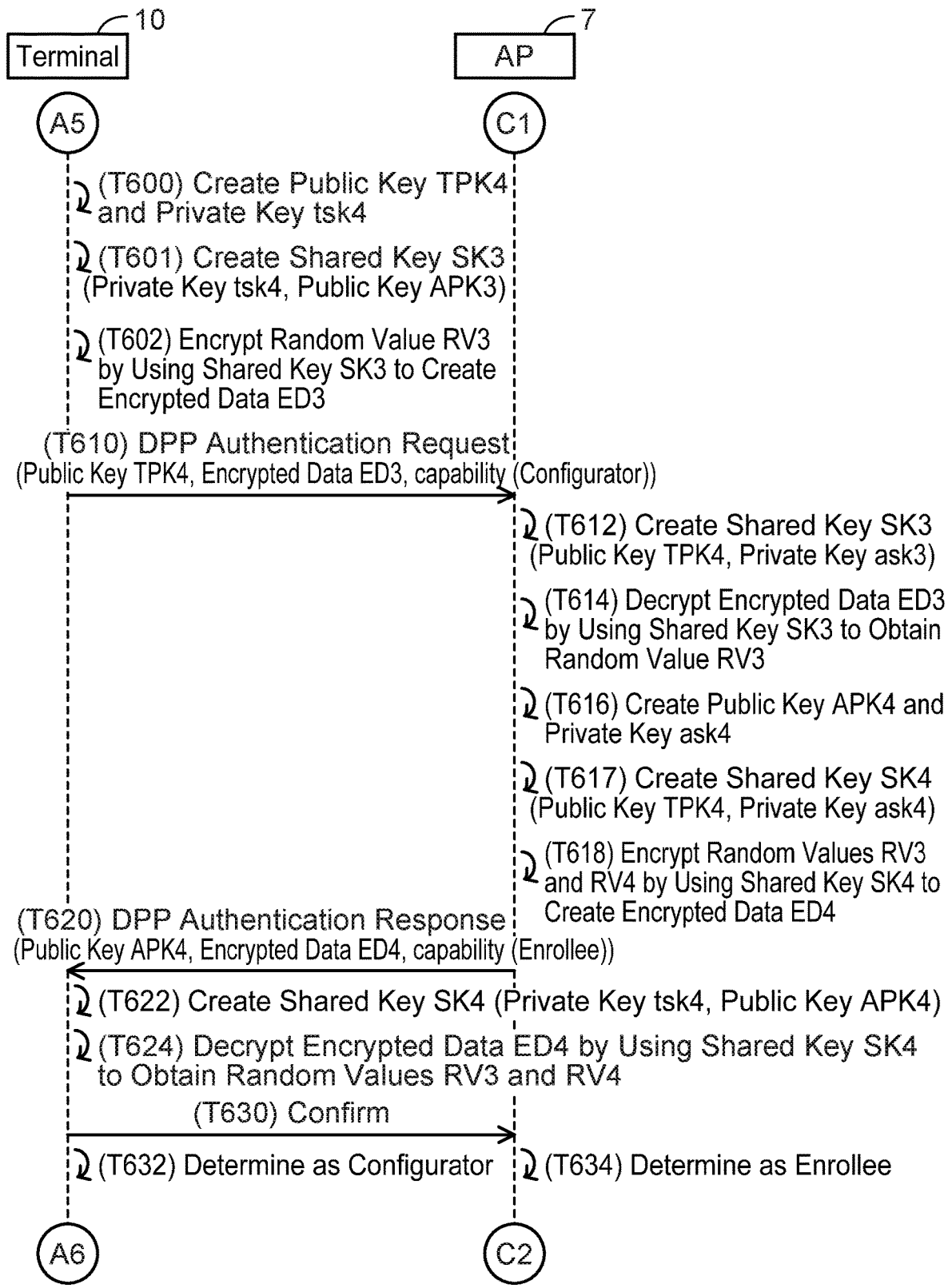
FIG. 8 shows a sequence diagram of an Authentication process with the other AP.

T504 to T522 are the same as T104 to T122 of FIG. 3 except that the communication target is the AP 7 and that a group ID "office2", the public key TPK3, the channel list L2, and the MAC address "macap2" of the AP 7 are used. When the process of T522 completes, the process of FIG. 7 ends.
(Authentication (Auth) with the AP 7; FIG. 8)
Next, the Auth process executed between the terminal 10 and the AP 7 in T40 of FIG. 2 will be described with reference to FIG. 8.

The terminal 10 creates a new public key TPK4 and a private key tsk4 of the terminal 10 in T600, and creates in T601 a shared key SK3 according to the ECDH by using the created private key tsk4 and the public key APK3 of the AP 7 obtained in T522 of FIG. 7. Then, in T602, the terminal 10 encrypts a random value RV3 by using the created shared key SK3 to create encrypted data ED3.

In T610, the terminal 10 sends an AReq to the AP 7 via the Wi-Fi I/F 16, with the MAC address "macap2" obtained in T522 of FIG. 7 as its destination. Here, the terminal 10 repeatedly sends the AReq to the AP 7 by sequentially using the plurality of communication channels in the channel list L2 obtained in T522 of FIG. 7. This AReq includes the public key TPK4 of the terminal 10 created in T600, the encrypted data ED3 created in T602, and the capability of the terminal 10. This capability includes the value indicating that the terminal 10 is capable of operating only as the Configurator.

In T610, the AP 7 receives the AReq from the terminal 10. Since this AReq is sent with the MAC address "macap2" of the AP 7 as its destination, the AP 7 can appropriately receive this AReq from the terminal 10. Further, the AReq of T610 is sent by sequentially using the plurality of communication channels in the channel list L2. Therefore, the AP 7 can appropriately receive this AReq from the terminal 10.

Next, the AP 7 executes processes of T612 and T614 for authenticating the sender of the AReq (i.e., the terminal 10). T612 and T614 are the same as T212 and T214 of FIG. 4 except that different data is used (keys, encrypted data, etc. are different). That is, the AP 7 creates a shared key SK3 by using the public key TPK4 and the private key ask3 in T612, and decrypts the encrypted data ED3 in the AReq by using the shared key SK3 in T614. In this case, the AP 7 determines that the authentication has succeeded and executes processes from T616 onward.

In T616, the AP 7 creates a new public key APK4 and a new private key ask4 of the AP 7. In a variant, the AP 7 may store the public key APK4 and the private key ask4 in advance. T617 and T618, which are executed subsequently, are the same as T217 and T218 of FIG. 4 except that different data is used (keys, encrypted data, etc. are different). That is, the AP 7 creates a shared key SK4 by using the public key TPK4 and the private key ask4 in T617, and encrypts the random value RV3 and a random value RV4 in T618 by using the shared key SK4 to create encrypted data ED4.

In T620, the AP 7 sends an ARes to the terminal 10. This ARes includes the public key APK4 of the AP 7 created in T616, the encrypted data ED4 created in T618, and a capability of the AP 7. This capability includes the value indicating that the AP 7 is capable of operating only as the Enrollee.

Figure 9:
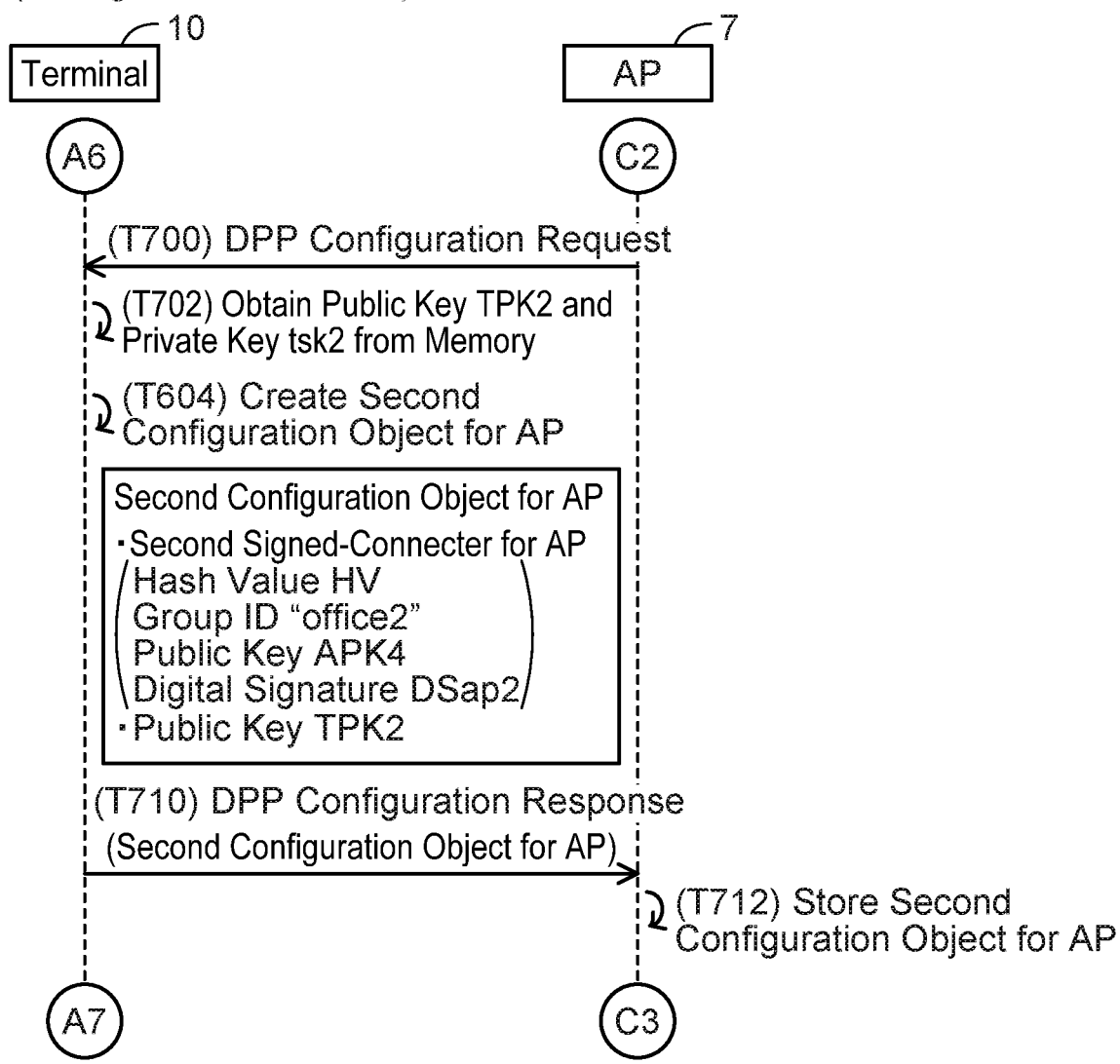
FIG. 9 shows a sequence diagram of a Configuration process with the other AP.

T622 to T634 are the same as T222 to T234 of FIG. 4 except that the communication target is the AP 7 and that different data is used (keys, encrypted data, etc. are different). As a result, the terminal 10 determines to operate as the Configurator, and the AP 7 determines to operate as the Enrollee. When the process of T634 completes, the process of FIG. 8 ends. When the process of FIG. 8 ends, the terminal 10 discards the public key TPK4 and the private key tsk4 (i.e., deletes them from the memory 34).
(Configuration (Config) with the AP 7; FIG. 9)
Next, the Config process executed between the terminal 10 and the AP7 in T45 of FIG. 2 will be described with reference to FIG. 9.

T700 is the same as T300 of FIG. 5 except that the communication target is the AP 7. In T702, the terminal 10 obtains the public key TPK2 and the private key tsk2 from the memory 34. Specifically, the terminal 10 specifies the first CO for terminal stored in the memory 34 to obtain the public key TPK2 included in the first CO for terminal. Then, the terminal 10 obtains the private key tsk2 corresponding to the obtained public key TPK2.

In T704, the terminal 10 creates a second CO for AP. T704 is the same as T304 of FIG. 5 except that different data is used (keys, etc. are different). The second CO for AP includes a second SC for AP and the public key TPK2 obtained in T702. The public key TPK2 included in the second CO for AP is the same as the public key TPK2 included in the first CO for AP. The second SC for AP includes a hash value HV, the group ID "office2" inputted in T508 of FIG. 7, the public key APK4 of the AP 7, and a digital signature DSap2. The digital signature DSap2 is information in which a third value obtained by hashing a combination of the hash value HV, the group ID "office2", and the public key APK4 is encrypted by the private key tsk2 obtained in T702.

Figure 10:
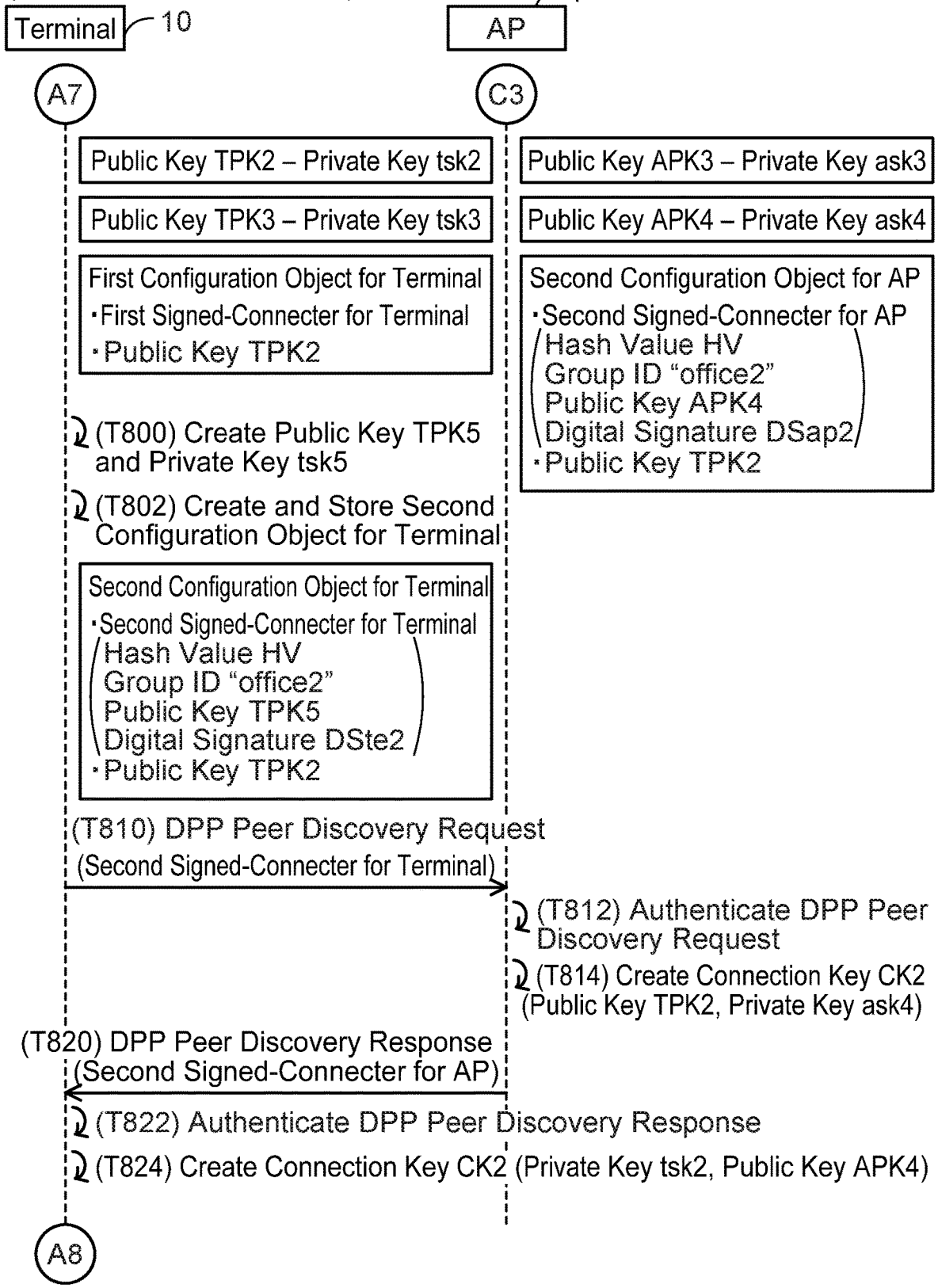
FIG. 10 shows a sequence diagram of a Network Access process with the other AP.

T710 and T712 are the same as T310 and T312 of FIG. 5 except that the communication target is the AP 7 and that the second CO for AP is used. When the process of T712 completes, the process of FIG. 9 ends.
(Network Access (NA) with AP 7; FIG. 10)
Next, the NA process executed between the terminal 10 and the AP 7 in T50 of FIG. 2 will be described with reference to FIG. 10.

In T800, the terminal 10 creates a new public key TPK5 and a private key tsk5 of the terminal 10. Next, in T802, the terminal 10 creates a second CO for terminal. T802 is the same as T402 of FIG. 6 except that different data is used (keys, etc. are different). The second CO for terminal includes a second SC for terminal and the public key TPK2 obtained in T702 of FIG. 9. The second SC for terminal includes a hash value HV, the group ID "office2", the created public key TPK5 of the terminal 10, and a digital signature DSte2. The digital signature DSte2 is information in which a fourth value obtained by hashing a combination of the hash value HV, the group ID "office2", and the public key TPK5 is encrypted by the private key tsk2 obtained in T702.

T810 is the same as T410 of FIG. 6 except that the communication target is the AP 7 and that the second SC for terminal is used. In T812, the AP 7 executes a process for authenticating the sender of the DReq (i.e., the terminal 10) and the respective information in the DReq (i.e., the hash value HV, "office2", and the public key TPK5). T812 is the same as T412 of FIG. 6 except that the AP 7 executes the process and that different data is used (keys, etc. are different). That is, the AP 7 determines that the hash value HV and the group ID "office2" in the second SC for terminal respectively match the hash value HV and the group ID "office2" in the second SC for AP (i.e., determines that the authentication of the sender of the DReq (i.e., the terminal 10) has succeeded). Further, the AP 7 decrypts the digital signature DSte2 in the second SC for terminal by using the public key TPK2 of the terminal 10 included in the second CO for AP, and determines that the fourth value obtained thereby matches a value obtained by hashing the respective information in the second SC for terminal (i.e., the hash value HV, "office2", and the public key TPK5) (i.e., determines that the authentication of the respective information in the DReq has succeeded).

T814 and T820 are the same as T414 and T420 of FIG. 6 except that the communication target is the AP 7 and that the private key ask4, a connection key CK2, and the second SC for AP of the AP 7 are used. In response to receiving the DRes from the AP 7 via the Wi-Fi I/F 16 in T820, the terminal 10 executes a process of T822 for authenticating the sender of the DRes (i.e., the AP 7) and the respective information in the DRes (i.e., the hash value HV, "office2", and the public key APK4). T822 is the same as T422 of FIG. 6 except that the communication target is the AP 7 and that different data is used (keys, etc. are different). That is, the terminal 10 determines that the hash value HV and the group ID "office2" in the second SC for AP respectively match the hash value HV and the group ID "office2" in the second SC for terminal (i.e., determines that the authentication of the sender of the DRes (i.e., the AP 7) has succeeded). Further, the terminal 10 decrypts the digital signature DSap2 in the second SC for AP by using the public key TPK2 of the terminal 10 included in the second CO for terminal, and determines that the third value obtained thereby matches a value obtained by hashing the respective information in the second SC for AP (i.e., the hash value HV, "office2", and the public key APK4) (i.e., determines that the authentication of the respective information in the DRes has succeeded).

T824 is the same as T424 of FIG. 6 except that different data is used (keys, etc. are different). When the process of T824 completes, the process of FIG. 10 ends. As described above, after the connection key CK2 has been shared between the terminal 10 and of the AP 7, the terminal 10 and the AP 7 use the connection key CK2 to execute the communication of 4way-handshake in T55 of FIG. 2. As a result, a Wi-Fi connection is established between the terminal 10 and the AP 7. Thereby, the terminal 10 participates, as a child station, in a wireless network in which the AP 7 operates as a parent station and which is identified by the group ID "office2". In this case, the terminal 10 stores the SSID "ap7" of the AP 7 in the memory 34 in association with the second CO for terminal.

Figure 11:
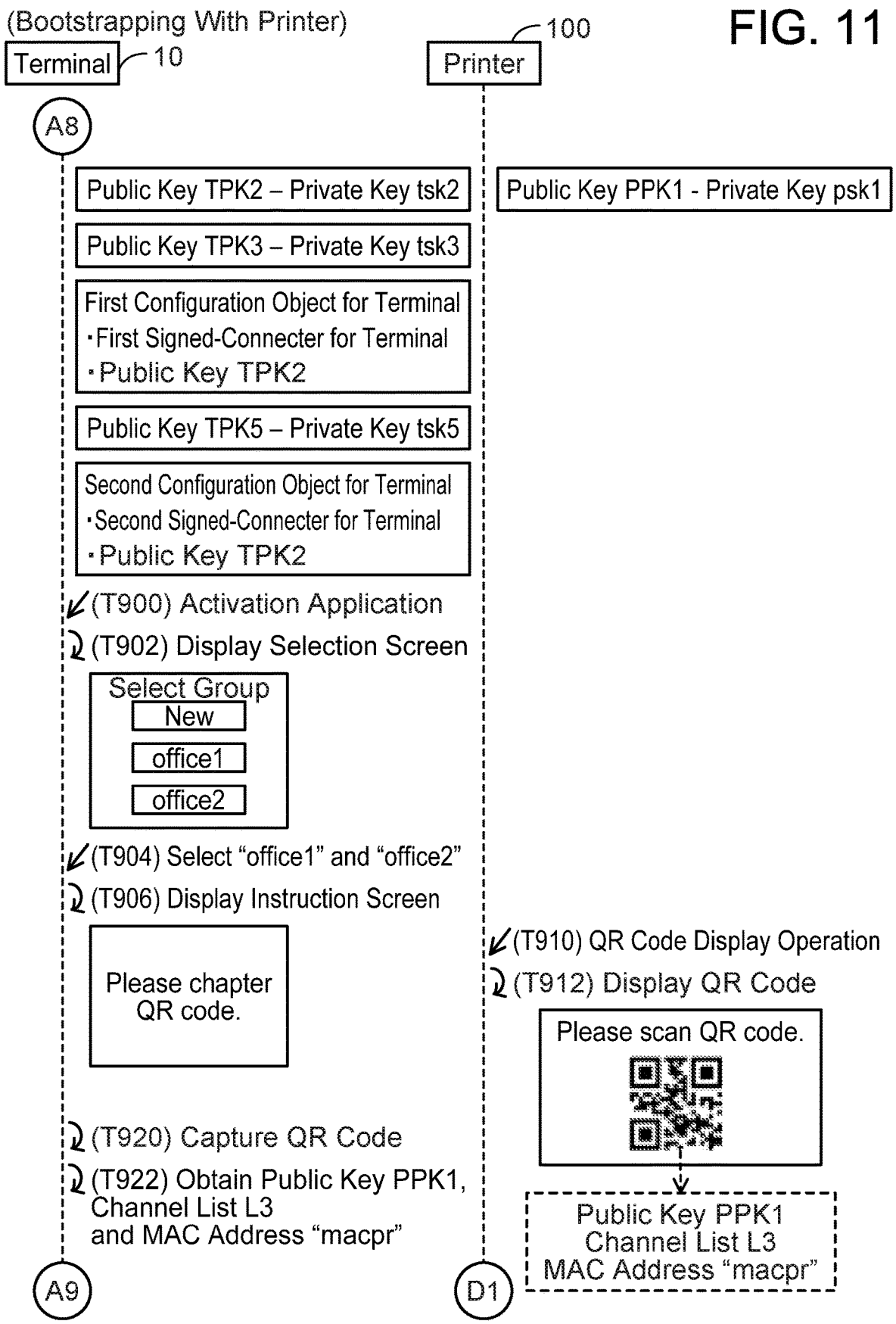
FIG. 11 shows a sequence diagram of a Bootstrapping process with a printer.

(Bootstrapping (BS) with Printer 100; FIG. 11)

Next, the BS process executed between the terminal 10 and the printer 100 in T65 of FIG. 2 will be described with reference to FIG. 11. In an initial state of FIG. 11, the terminal 10 already stores, in the memory 34, the public key TPK2 and the private key tsk2 of the terminal 10 (see T302 of FIG. 5), the public key TPK3 and the private key tsk3 of the terminal 10 (see T400 of FIG. 6), the first CO for terminal (see T402), the public key TPK5 and the private key tsk5 of the terminal 10 (see T800 of FIG. 10), and the second CO for terminal (see T802 of FIG. 10). Further, the printer 100 stores in advance, in the memory 134, a public key PPK1 and a private key psk1 of the printer 100.

T900 is the same as T100 of FIG. 3. In T902, the terminal 10 displays a selection screen on the display unit 14. Specifically, the terminal 10 firstly obtains the group ID "office1" included in the first SC for terminal in the first CO for terminal stored in the memory 34. Further, the terminal 10 obtains the group ID "office2" included in the second SC for terminal in the second CO for terminal stored in the memory 34. Then, the terminal 10 displays on the display unit 14 a selection screen that includes an "office1" button having the same character string as the obtained group ID "office1" and an "office2" button having the same character string as the obtained group ID "office2", in addition to the "New" button.

In a case where the user desires to establish a Wi-Fi connection between the printer 100 and any one of the AP 6 and the AP 7, the user selects both of the "office1" button and the "office2" button in the selection screen in T904. In this case, in T906, the terminal 10 displays, on the display unit 14, an instruction screen including a message that indicates a QR code is to be captured.

In response to a QR code display operation, which is for displaying a QR code, being executed by the user in T910, the printer 100 displays a QR code on the display unit 114 in T912. This QR code is a coded image obtained by coding the public key PPK1 stored in advance in the memory 134, a channel list L3 stored in advance in the memory 134, and the MAC address "macpr" of the printer 100. The channel list L3 is a list of a plurality of communication channels to be used in Auth (see T70 of FIG. 2) (i.e., a plurality of communication channels that the printer 100 can use). This QR code may be created by the printer 100 in T912, or may be stored in advance in the memory 134 at shipment of the printer 100. Further, in a variant, this QR code may be adhered to a housing of the printer 100.

In T920, the terminal 10 uses the camera 15 to capture the QR code displayed on the printer 100. Then, in T922, the terminal 10 decodes the captured QR code to obtain the public key PPK1, the channel list L3, and the MAC address "macpr". When the process of T922 completes, the process of FIG. 11 ends.

Figure 12:
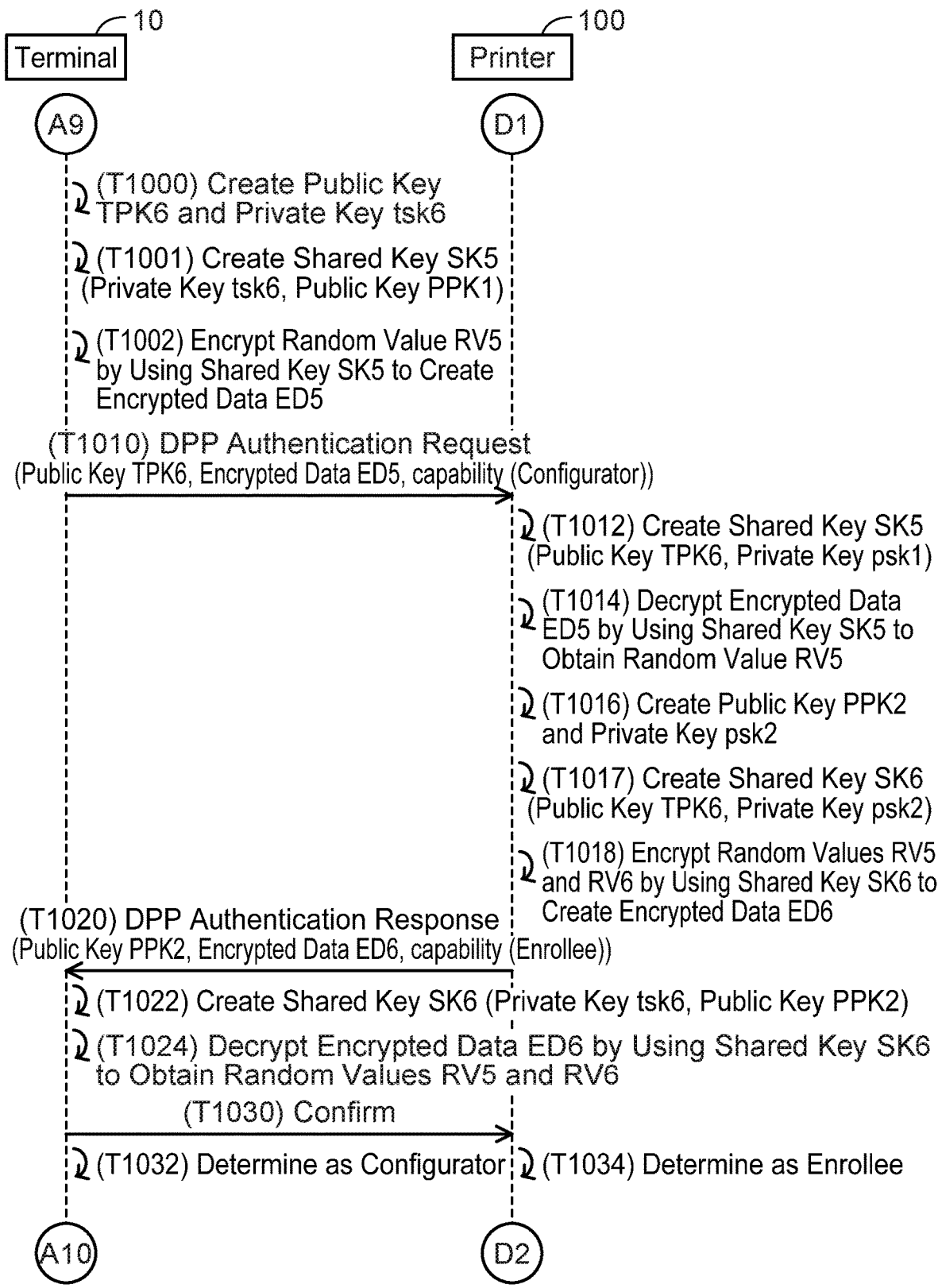
FIG. 12 shows a sequence diagram of an Authentication process with the printer.

(Authentication (Auth) with Printer 100; FIG. 12)

Next, the Auth process executed between the terminal 10 and the printer 100 in T70 of FIG. 2 will be described with reference to FIG. 12.

The terminal 10 creates a new public key TPK6 and a private key tsk6 of the terminal 10 in T1000, and creates in T1001 a shared key SK5 according to the ECDH by using the created private key tsk6 and the public key PPK1 of the printer 100 obtained in T922 of FIG. 11. Then, in T1002, the terminal 10 encrypts a random value RV5 by using the created shared key SK5 to create encrypted data ED5.

In T1010, the terminal 10 sends an AReq to the printer 100 via the Wi-Fi I/F 16 with the MAC address "macpr" obtained in T922 of FIG. 11 as its destination. Here, the terminal 10 repeatedly sends the AReq to the printer 100 by sequentially using the plurality of communication channels in the channel list L3 obtained in T922. This AReq includes the public key TPK6 of the terminal 10 created in T1000, the encrypted data ED5 created in T1002, and the capability of the terminal 10. This capability includes the value indicating that the terminal 10 is capable of operating only as the Configurator.

In T1010, the printer 100 receives the AReq from the terminal 10 via the Wi-Fi I/F 116. Since this AReq is sent with the MAC address "macpr" of the printer 100 as its destination, the printer 100 can appropriately receive this AReq. Further, since this AReq is sent by sequentially using the plurality of communication channels in the channel list L3 (i.e., the plurality of communication channels that the printer 100 can use), the printer 100 can appropriately receive this AReq.

Next, the printer 100 executes processes of T1012 and T1014 for authenticating the sender of the AReq (i.e., the terminal 10). T1012 and T1014 are the same as T212 and T214 of FIG. 4 except that the printer 100 executes these processes and that different data is used (keys, encrypted data, etc. are different). That is, the printer 100 creates a shared key SK5 by using the public key TPK6 and the private key psk1 in T1012, and uses the shared key SK5 to decrypt the encrypted data ED5 in the AReq in T1014. In this case, the printer 100 determines that the authentication has succeeded and executes processes from T1016 onward.

In T1016, the printer 100 creates a new public key PPK2 and a new private key psk2 of the printer 100. In a variant, the public key PPK2 and the private key psk2 may be stored in advance in the memory 134. T1017 and T1018, which are executed subsequently, are the same as T217 and T218 of FIG. 4 except that the printer 100 executes these processes and that different data is used (keys, encrypted data, etc. are different). That is, the printer 100 creates a shared key SK6 by using the public key TPK6 and the private key psk2 in T1017, and creates encrypted data ED6 by using the shared key SK6 to encrypt the random values RV5, RV6 in T1018.

In T1020, the printer 100 sends an ARes to the terminal 10 via the Wi-Fi I/F 116. This ARes includes the public key PPK2 of the printer 100 created in T1016, the encrypted data ED6 created in T1018, and a capability of the printer 100. This capability includes the value indicating that the printer 100 is capable of operating only as the Enrollee.

T1022 to T1034 are the same as T222 to T234 of FIG. 4 except that the communication target is the printer 100 and that different data is used (keys, encrypted data, etc. are different). As a result, the terminal 10 determines to operate as the Configurator, and the printer 100 determines to operate as the Enrollee. When the process of T1034 completes, the process of FIG. 12 ends. When the process of FIG. 12 ends, the terminal 10 discards the public key TPK6 and the private key tsk6 (i.e., deletes them from the memory 34).

Figure 13:
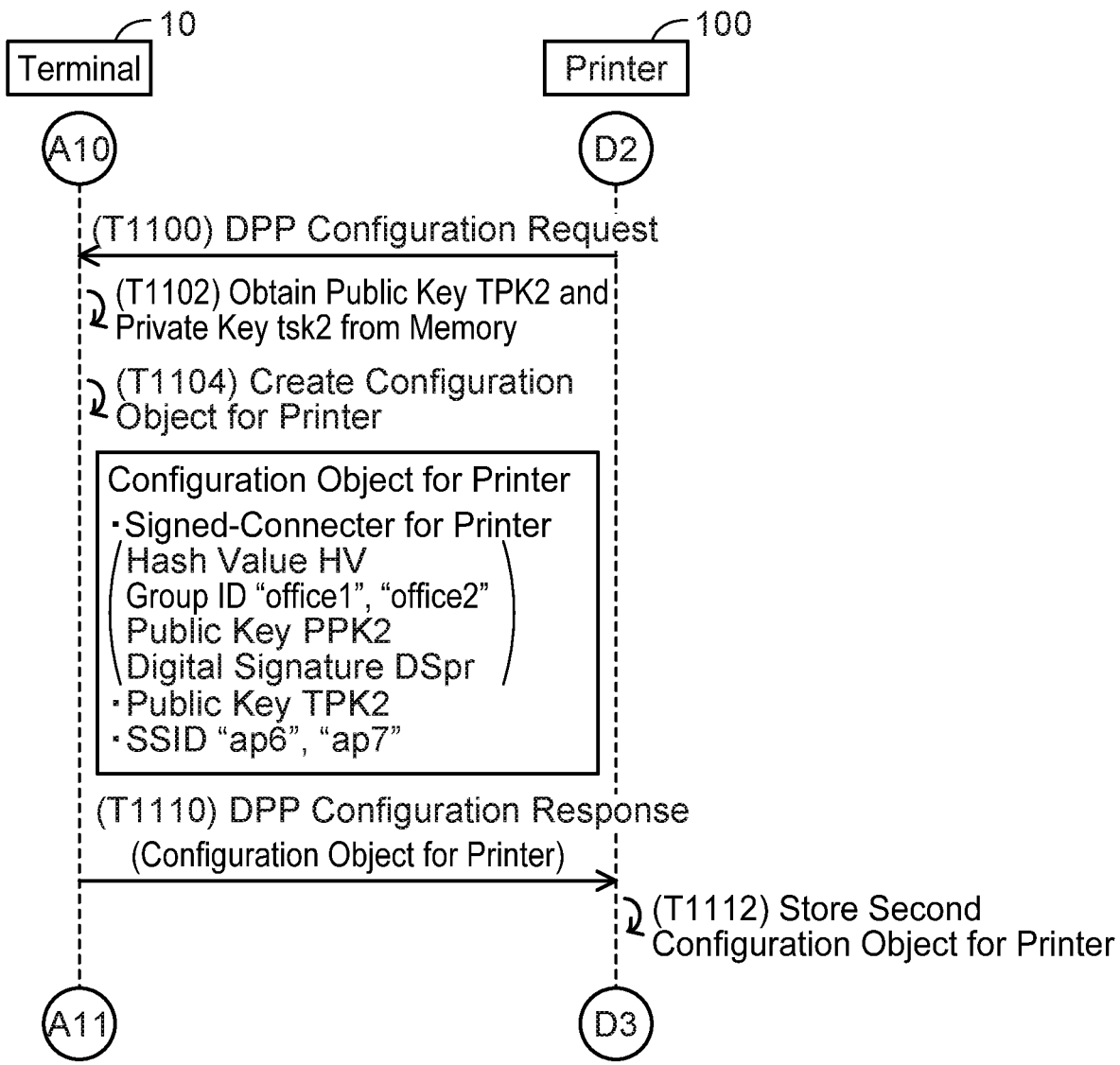
FIG. 13 shows a sequence diagram of a Configuration process with the printer.

(Configuration (Config) with Printer 100; FIG. 13)

Next, the Config process executed between the terminal 10 and the printer 100 in T75 of FIG. 2 will be described with reference to FIG. 13.

In T1100, the printer 100 sends a CReq to the terminal 10 via the Wi-Fi I/F 116. This CReq is a signal requesting a CO for printer to be sent.

The terminal 10 receives the CReq from the printer 100 via the Wi-Fi I/F 16 in T1100. In this case, in T1102, the terminal 10 obtains the public key TPK2 and the private key tsk2 of the terminal 10 from the memory 34. Specifically, the terminal 10 obtains, from the memory 34, the first CO for terminal including the group ID "office1" which has the same character string as "office1" which have been selected in T904 of FIG. 11 and the second CO for terminal including the group ID "office2" which has the same character string as "office2" which have been selected in T904. As shown in the initial state of FIG. 11, the first and the second COs for terminal include the public key TPK2. Therefore, the terminal 10 can obtain the public key TPK2 included in the first and the second COs for terminal. Then, the terminal 10 obtains the private key tsk2 corresponding to the obtained public key TPK2.

In T1104, the terminal 10 creates a CO for printer. Specifically, the terminal 10 executes the following processes. That is, the terminal 10 firstly creates a hash value HV by hashing the public key TPK2 of the terminal 10. Further, the terminal 10 creates a fifth value by hashing a combination of the hash value HV, the two group IDs "office1" and "office2", and the public key PPK2 of the printer 100 in the ARes of T1020 of FIG. 12. Then, the terminal 10 creates a digital signature DSpr according to the ECDSA by encrypting the created fifth value by using the private key tsk2 of the terminal 10. As a result, the terminal 10 can create an SC for printer including the hash value HV, the two group IDs "office1" and "office2", the public key PPK2 of the printer 100, and the digital signature DSpr. Further, the terminal 10 obtains, from the memory 34, the SSID "ap6" of the AP 6 stored in association with the first CO for terminal that includes the group ID "office1", and the SSID "ap7" of the AP 7 stored in association with the second CO for terminal that includes the group ID "office2". Then, the terminal 10 creates a single CO for printer including the SC for printer, the public key TPK2 of the terminal 10, and the two SSIDs "ap6" and "ap7". This can reduce the processing load of the terminal 10 as compared, for example, to a configuration in which the terminal 10 creates a first CO for printer including the group ID "office1" and a second CO for printer including the group ID "office2". In a variant, the above configuration may be adopted. The public key TPK2 included in the CO for printer is the same as the public key TPK2 included in the first and second COs for AP.

In T1110, the terminal 10 sends a CRes including the CO for printer created in T1104 to the printer 100 via the Wi-Fi I/F 16.

The printer 100 receives the CRes from the terminal 10 via the Wi-Fi I/F 116 in T1110. In this case, in T1112, the printer 100 stores, in the memory 134, the CO for printer in this CRes. When the process of T1112 completes, the process of FIG. 13 ends.

Figure 14:
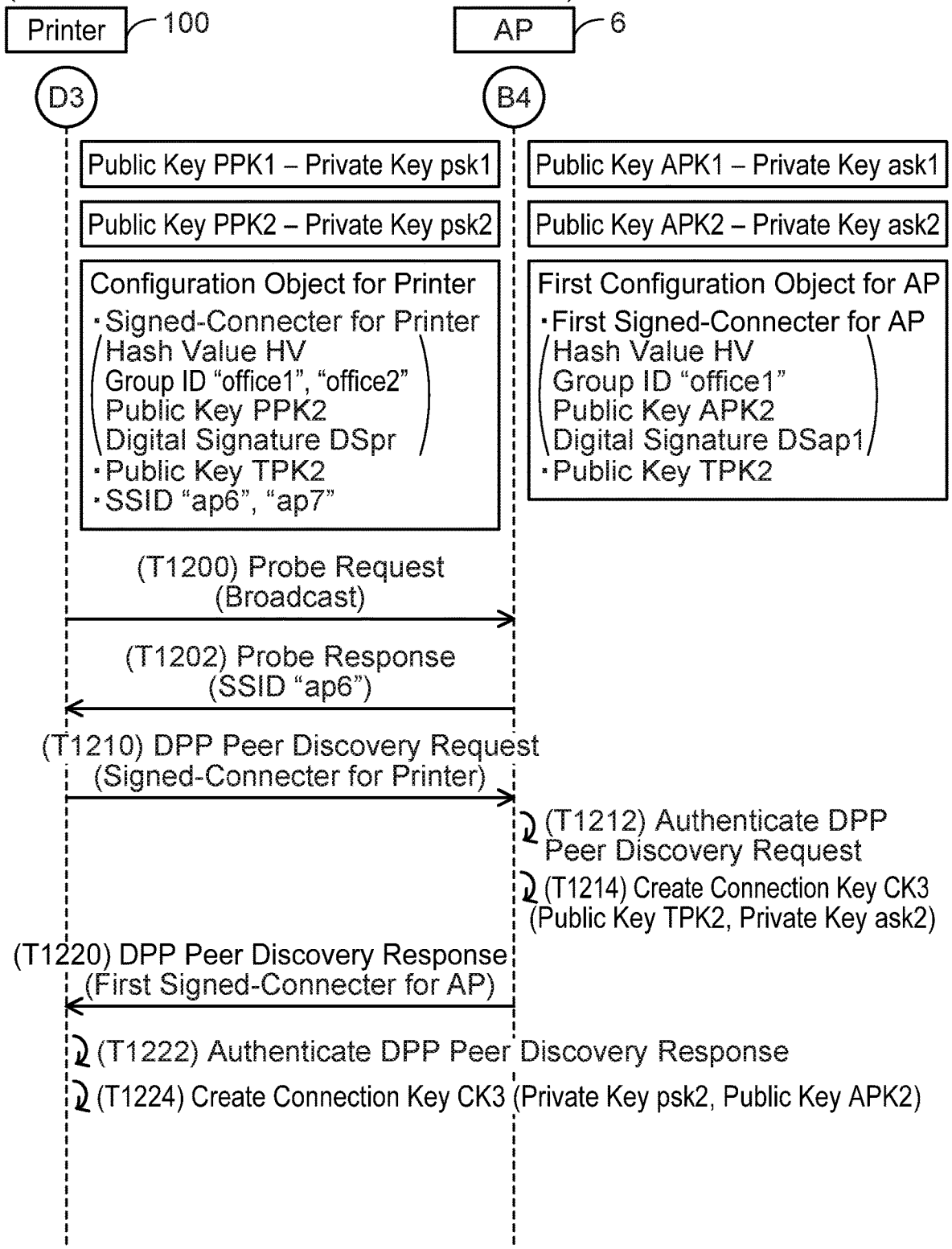
FIG. 14 shows a sequence diagram of a Network Access process between the printer and the AP.

(Network Access (NA) Between Printer 100 and AP 6; FIG. 14)

Next, the NA process of T80 of FIG. 2 executed between the printer 100 and the AP 6 when the printer 100 is present near the AP 6 will be described with reference to FIG. 14. In an initial state of FIG. 14, the printer 100 already stores, in the memory 134, the public key PPK1 and the private key psk1, the public key PPK2 and the private key psk2, and the CO for printer. Further, the AP 6 already stores the public key APK1 and the private key ask1, the public key APK2 and the private key ask2, and the first CO for AP.

In T1200, the printer 100 sends a Probe Request (hereinbelow simply termed "PReq") by broadcast via the Wi-Fi I/F 116. This PReq is a signal for searching for a peripheral device of the printer 100.

In response to sending the PReq by broadcast, the printer 100 receives a Probe Response (hereinbelow simply termed "PRes") from each of a plurality of devices present around the printer 100. In a case of receiving a PRes including the SSID "ap6" from the AP 6 via the Wi-Fi I/F 116 in T1202, the printer 100 determines that the SSID "ap6" included in the CO for printer stored in the memory 134 matches the SSID "ap6" included in the received PRes. Thereby, the printer 100 can determine that the communication target device is the AP 6 and can send a DReq including the SC for printer to the AP 6 via the Wi-Fi I/F 116 in T1210.

In response to receiving the DReq from the printer 100 in T1210, the AP 6 executes a process of T1212 for authenticating the sender of the DReq (i.e., the printer 100) and the respective information in the DReq (i.e., the hash value HV, "office1", and the public key PPK2). T1212 is the same as T412 of FIG. 6 except that different data is used (keys, etc. are different). That is, the AP 6 determines that the hash value HV and the group ID "office1" in the SC for printer respectively match the hash value HV and the group ID "office1" in the first SC for AP (i.e., determines that the authentication of the sender of the DReq (i.e., the printer 100) has succeeded). Further, the AP 6 decrypts the digital signature DSpr in the SC for printer by using the public key TPK2 of the terminal 10 included in the first CO for AP, and determines that the fifth value obtained thereby matches a value obtained by hashing the respective information in the SC for printer (i.e., the hash value HV, "office1", "office2", and the public key PPK2) (i.e., determines that the authentication of the respective information in the DReq has succeeded).

T1214 and T1220 are the same as T414 and T420 of FIG. 6 except that the communication target is the printer 100 and that different data is used (keys, etc. are different). In response to receiving the DRes from the AP 6 via the Wi-Fi I/F 116 in T1220, the printer 100 executes a process of T1222 for authenticating the sender of the DRes (i.e., the AP 6) and the respective information in the DRes (i.e., the hash value HV, "office1", and the public key APK2). T1222 is the same as T422 of FIG. 6 except that the printer 100 executes this process and that different data is used (keys, etc. are different). That is, the printer 100 determines that the hash value HV and the group ID "office1" in the first SC for AP respectively match the hash value HV and the group ID "office1" in the SC for printer (i.e., determines that the authentication of the sender of the DRes (i.e., the AP 6) has succeeded). The printer 100 decrypts the digital signature DSap1 in the first SC for AP by using the public key TPK2 of the terminal 10 included in the CO for printer, and determines that the first value obtained thereby matches a value obtained by hashing the respective information in the first SC for AP (i.e., the hash value HV, "office1", and the public key APK2) (i.e., determines that the authentication of the respective information in the DRes has succeeded).

In T1224, the printer 100 creates a connection key CK3 according to the ECDH by using the private key psk2 of the printer 100 and the public key APK2 of the AP 6 in the first SC for AP. Here, the connection key CK3 created by the AP 6 in T1214 is the same as the connection key CK3 created by the printer 100 in T1224. Thereby, the connection key CK3 for establishing a Wi-Fi connection is shared between the printer 100 and the AP 6. When T1224 completes, the process of FIG. 14 ends.

As described above, after the connection key CK3 has been shared between the printer 100 and the AP 6, the printer 100 and the AP 6 use the connection key CK3 to execute the communication of 4way-handshake in T85 of FIG. 2. As a result, a Wi-Fi connection is established between the printer 100 and the AP 6. As such, the printer 100 participates, as a child station, in the wireless network in which the AP 6 operates as a parent station and which is identified by the group ID "office1".

Although not illustrated, when the printer 100 is present near the AP 7, the same processes as T1200 to T1224 are executed by the printer 100 except that the communication target is the AP 7 and that the SSID "ap7" of the AP 7 and the second SC for AP are used, as a result of which a Wi-Fi connection is established between the printer 100 and the AP 7. As such, the printer 100 participates, as a child station, in the wireless network in which the AP 7 operates as a parent station and which is identified by the group ID "office2".

Figure 15:
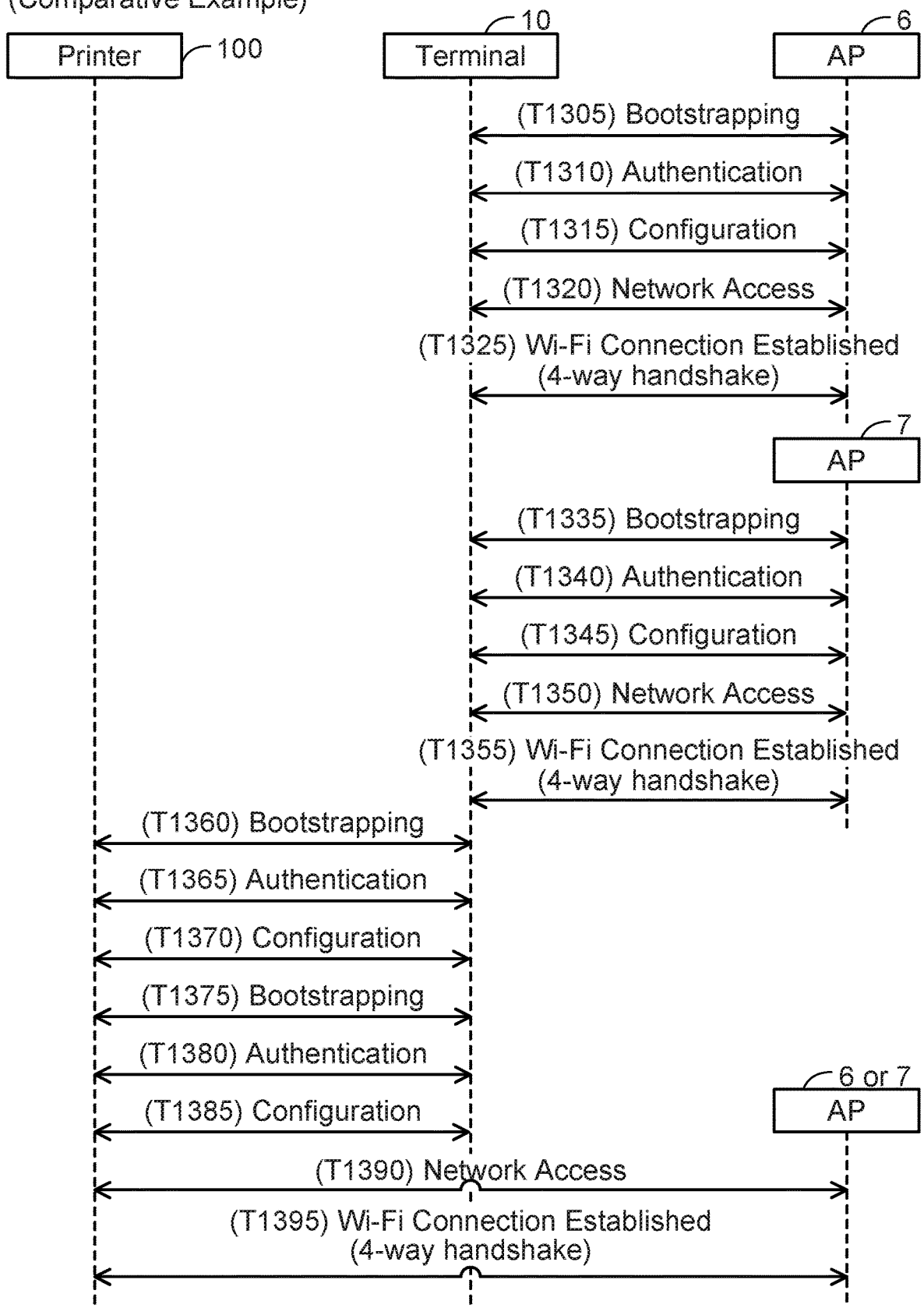
FIG. 15 shows an explanatory diagram for explaining an outline of a comparative example.

Comparative Example; FIG. 15

Here, a comparative example will be described with reference to FIG. 15. In the comparative example, the terminal 10 sends a CO for printer including a single group ID to the printer 100. T1305 to T1355 are the same as T5 to T55 of FIG. 2. That is, the terminal 10 sends the first CO for AP including the group ID "office1" to the AP 6 in T1315, and sends the second CO for AP including the group ID "office2" to the AP 7 in T1345.

Next, the terminal 10 executes a process of sending a first CO for printer for establishing a Wi-Fi connection between the printer 100 and the AP 6. That is, the terminal 10 executes BS with the printer 100 in T1360, executes Auth with the printer 100 in T1365, and executes Config with the printer 100 in T1370. In this Config, the terminal 10 creates a first CO for printer including the single group ID "office1", and sends the first CO for printer to the printer 100. As a result, the first CO for printer is stored in the printer 100.

Further, the terminal 10 executes a process of sending a second CO for printer for establishing a Wi-Fi connection between the printer 100 and the AP 7. That is, the terminal 10 executes BS with the printer 100 again in T1375, executes Auth with the printer 100 again in T1380, and executes Config with the printer 100 again in T1385. In this Config, the terminal 10 creates a second CO for printer including the single group ID "office2", and sends the second CO for printer to the printer 100. As a result, the second CO for printer is stored in the printer 100.

In T1390, the printer 100 and the AP 6 or the AP 7 execute NA according to the DPP scheme. Specifically, when the printer 100 is present near the AP 6, the printer 100 and the AP 6 execute the NA according to the DPP scheme by using the first CO for printer and the first CO for AP. When the printer 100 is present near the AP 7, the printer 100 and the AP 7 execute the NA according to the DPP scheme by using the second CO for printer and the second CO for AP. As a result, the connection key is shared between the printer 100 and the AP 6 or the AP 7, and the printer 100 and the AP 6 or the AP 7 execute the communication of 4way-handshake in T1395, by which a Wi-Fi connection is established between the printer 100 and the AP 6 or the AP 7. When the process of T1395 completes, the process of FIG. 15 ends.

Effect of the Present Embodiment

As described above, in the comparative example, the terminal 10 executes each of BS, Auth, and Config twice with the printer 100 (T1360 to T1385 of FIG. 15) and sends the two COs for printer to the printer 100. That is, the user of the terminal 10 has to perform an operation for sending the CO for printer to the printer 100 twice (e.g., the operation of capturing the QR code of the printer 100 (T920 of FIG. 11), etc.). By contrast, in the present embodiment, the terminal 10 executes each of the BS, Auth, and Config only once with the printer 100 (T65 to T75 of FIG. 2) and sends the single CO for printer including the two group IDs "office1" and "office2" to the printer 100. Since the CO for printer includes the group ID "office1", the printer 100 can establish a Wi-Fi connection with the AP 6 operating as the parent station of the wireless network identified by the group ID "office1". Specifically, when the CO for printer is used by the printer 100, the first CO for AP is used by the AP 6, and the NA is executed between the printer 100 and the AP 6 (T80 of FIG. 2), a Wi-Fi connection is established between the printer 100 and the AP 6 (T85). Further, since the CO for printer also includes the group ID "office2", the printer 100 can establish a wireless connection with the AP 7 operating as the parent station of the wireless network identified by the group ID "office2". Specifically, when the CO for printer is used by the printer 100, the second CO for AP is used by the AP 7, and the NA is executed between the printer 100 and the AP 7 (T80), a Wi-Fi connection is established between the printer 100 and the AP 7 (T85). As such, the single CO for printer including the two group IDs "office1" and "office2" is sent to the printer 100 by the user of the terminal 10 performing the operation for sending the CO for printer to the printer 100 only once, as a result of which the printer 100 can establish a Wi-Fi connection with the AP 6 or the AP 7. Therefore, as compared with the comparative example, the workload of the user of the terminal 10 can be reduced.

Further, as described above, in the case where any one of the "office1" button and the "office2" button on the selection screen, which is displayed by the terminal 10 on the display unit 14 (T902 of FIG. 11), is selected by the user (T904), the terminal 10 creates the CO for printer including the two group IDs "office1" and "office2" having the same character strings as the character strings which have been selected (T1104 of FIG. 13) and sends the CO for printer to the printer 100 (T1110). Therefore, a Wi-Fi connection can be established between the printer 100 and the user-desired AP.

Further, as described above, the first and second COs for AP and the CO for printer include the public key TPK2 which is the same as the public key TPK2 of the terminal 10. Here, for example, a configuration is assumed in which the terminal 10 sends, to the AP 7, a second CO for AP including a public key (e.g., TPK10) that is different from the public key TPK2. In this case, the terminal 10 creates a second SC for AP by using a private key (e.g., tsk10) corresponding to the public key TPK10. Further, in the Config with the printer 100, the terminal 10 creates the first SC for printer including the group ID "office1" by using the private key tsk2 and creates a second SC for printer including the group ID "office2" by using the private key tsk10. Then, the terminal 10 creates a CO for printer including the first SC for printer, the second SC for printer, the public key TPK2, the public key TPK10, and the SSIDs "ap6" and "ap7", and then sends this CO for printer to the printer 100. According to this, in order to create the CO for printer, the terminal 10 has to store the public key TPK10 and the private key tsk10 in the memory 34 in addition to the public key TPK2 and the private key tsk2, as well as has to create two SCs for printer. By contrast, in the present embodiment, in order to create the CO for printer, the terminal 10 simply needs to store the public key TPK2 and the private key tsk2 in the memory 34, and simply needs to create the single SC for printer. Therefore, in the present embodiment, the processing load of the terminal 10 can be reduced as compared to the aforementioned configuration. In a variant, the aforementioned configuration may be adopted.

(Correspondence Relationships)

The terminal 10, the AP 6, the AP 7, and the printer 100 are examples of "terminal device", "first access point", "second access point", and "communication device", respectively. The public key APK1 of the AP 6, the public key APK3 of the AP 7, and the public key PPK1 of the printer 100 are examples of "first public key", "second public key", and "third public key", respectively. The AReq of T210 of FIG. 4, the AReq of T610 of FIG. 8, and the AReq of T1010 of FIG. 12 are examples of "first authentication request", "second authentication request", and "third authentication request", respectively. The ARes of T220, the ARes of T620, and the ARes of T1020 are examples of "first authentication response", "second authentication response", and "third authentication response", respectively. The first CO for AP, the second CO for AP, and the CO for printer are examples of "first connection information", "second connection information", and "third connection information", respectively.

The group ID "office1" and the group ID "office2" are examples of "first identifier" and "second identifier", respectively.

The public key TPK2 of the terminal 10 is an example of "same public key of the terminal device". The SSID "ap6" of the AP 6 and the SSID "ap7" of the AP 7 are examples of "first SSID" and "second SSID", respectively. The PReq of T1200 of FIG. 14 is an example of "device search signal".

The process of T122 of FIG. 3, the process of T210, the process of T220 of FIG. 4, and the process of T310 of FIG. 5 are examples of "obtain a first public key", "send a first authentication request", "receive a first authentication response", and "send first connection information", respectively. The process of T522 of FIG. 7, the process of T610, the process of T620 of FIG. 8, and the process of T710 of FIG. 9 are examples of "obtain a second public key", "send a second authentication request", "receive a second authentication response", and "send second connection information", respectively. The process of T922 of FIG. 11, the process of T1010, the process of T1020 of FIG. 12, and the process of T1110 of FIG. 13 are examples of "obtain a third public key", "send a third authentication request", "receive a third authentication response", and "send third connection information", respectively.

The process of T1010, the process of T1020 of FIG. 12, and the process of T1110 of FIG. 13 are examples of "receive an authentication request", "send an authentication response", and "receive connection information" by "communication device", respectively. The processes of T80 and T85 of FIG. 2 are examples of "establish a wireless connection" by "communication device".

(Variant 1) In the above embodiment, the terminal 10 executes the BS, Auth, Config, and NA once each with each of the AP 6 and the AP 7. However, the configuration is not limited so, and the BS, Auth, Config, and NA may be executed twice with one of the APs (e.g., the AP 6). In wireless communication according to the Wi-Fi scheme, radio waves (i.e., carrier waves) in one of two frequency bands 2.4 GHz and 5.0 GHz are used. In the present variant, the AP 6 supports the two frequency bands (i.e., 2.4 GHz and 5.0 GHz), and two QR codes (i.e., one for 2.4 GHz and the other for 5.0 GHz) are adhered to the housing of the AP 6. After the terminal 10 has executed the BS, Auth, Config, and NA twice with the AP 6 by using the two QR codes of the AP 6, the terminal 10 executes the BS, Auth, and Config with the printer 100. Thereby, the printer 100 can establish, with the AP 6, a Wi-Fi connection in which a frequency band supported by the printer 100 (i.e., 2.4 GHz or 5.0 GHz) is used. That is, "second access point" may be the same as "first access point".

(Variant 2) The first CO for AP and the second CO for AP may include the same group ID (e.g., "office"), and the CO for printer may include the single group ID "office". In the present variant as well, when the printer 100 is present near the AP 6, the printer 100 can send a PReq by broadcast in T1200 of FIG. 14, receive a PRes including the SSID "ap6" from the AP 6 in T1202, and execute the same processes as T1210 to T1224. Further, when the printer 100 is present near the AP 7, the printer 100 can send a PReq by broadcast, receive a PRes including the SSID "ap7" from the AP 7, and execute the same processes as T1210 to T1224 except that the communication target is the AP 7. In the present variant, the SSID "ap6" and the SSID "ap7" are examples of "first identifier" and "second identifier", respectively.

(Variant 3) In the above embodiment, the terminal 10 may execute the processes of T5 to T55 with the AP 6 or the AP 7 after having executed the processes of T65 to T75 of FIG.

2 with the printer 100. That is, "obtain a third public key" may be executed such that the third public key is obtained before the first connection information is sent to the first access point and the second connection information is sent to the second access point.

(Variant 4) The processes T902 and 904 of FIG. 11 may be omitted. In the present variant, "cause a display unit of the terminal device to display a selection screen" may be omitted.

(Variant 5) In the above embodiment, the terminal 10 displays the selection screen in the BS (T102 of FIG. 3, T502 of FIG. 7, T902 of FIG. 11). However, the configuration is not limited to so, and the terminal 10 may display the selection screen in the Auth or in the Config, for example. That is, "selection screen" may be displayed after the third public key has been obtained in the Bootstrapping.

(Variant 6) The CO for printer may not include the two SSIDs "ap6" and "ap7". In this case, the printer 100 may omit the processes of T1200 and T1202 of FIG. 14 and send the DReq by broadcast, for example. That is, "connection information" may not include "first SSID" or "second SSID". Further, in this variant, "send a device search signal" may be omitted.

(Variant 7) "Communication device" may not be the printer 100, and may be another device such as a scanner, a multi-function device, a portable terminal, a PC, or a server.

(Variant 8) A process for creating a shared key (for example, SK1) (e.g., T201 of FIG. 4) is not limited to the process according to the ECDH as described in the above embodiment, and may be another process according to the ECDH. Further, a process for creating a shared key is not limited to a process according to the ECDH, and a process according to another scheme (for example, DH (Diffie-Hellman key exchange), etc.) may be executed. Further, in the above embodiment, the digital signatures (DSap1, etc.) are created according to the ECDSA, however, they may be created according to another scheme (for example, DSA (Digital Signature Algorithm), RAS (Rivest-Shamir-Adleman cryptosystem) etc.).

(Variant 9) For example, the QR code displayed on the printer 100 in T912 of FIG. 11 may not be a QR code in which the channel list L3 and the MAC address "macpr" are coded. That is, the QR code of the printer 100 may be any coded image as long as it is obtained by coding at least the public key PPK1. In this case, in response to receiving the QR code display operation in T910, the printer 100 monitors whether an AReq is received by using one wireless channel among all wireless channels that the printer 100 can use. Further, in T1010 of FIG. 12, the terminal 10 sequentially sends the AReq by broadcast by sequentially using all the wireless channels that the terminal 10 can use.

(Variant 10) A standard "Device Provisioning Protocol Technical Specification Version 1.0" created by the Wi-Fi Alliance describes that shared codes, keys, phrases, and words are called "codes". In T912 of FIG. 11, instead of the QR code, the printer 100 may display, on the display unit 114, an image including a shared code, a key, a phrase, or a word that are obtained by coding the public key PPK1, the channel list L3, and the MAC address "macpr".

(Variant 11) In the above embodiment, the respective processes of FIGS. 2 to 15 are implemented by software (that is, the programs 36, 38, 136). Instead of this, one or more of the processes may be implemented by hardware such as a logic circuit.

What is claimed is:

1. A non-transitory computer-readable medium storing computer-readable instructions for a terminal device,
wherein the computer-readable instructions, when executed by a processor of the terminal device, cause the terminal device to:
store a first Device Provisioning Protocol (DPP) Configuration Object including a first identifier for identifying a first wireless network and a second DPP Configuration Object including a second identifier for identifying a second wireless network, the second identifier being different from the first identifier;
cause a display unit of the terminal device to display a single screen having a list including the first identifier in the first DPP Configuration Object and the second identifier in the second DPP Configuration Object, wherein in the list, both of the first identifier and the second identifier are displayed separately,
receive an instruction of selecting the both of the first identifier and the second identifier in the list via an operation unit of the terminal device;
obtain a third public key which is a public key of a communication device;
in a case where the third public key is obtained, send a third authentication request in which the third public key is used to the communication device;
in a case where the third authentication request is sent to the communication device, receive a third authentication response, which is a response for the third authentication request, from the communication device; and
in a case where the third authentication response is received from the communication device and the instruction of selecting the both of the first identifier and the second identifier in the list is received, send third DPP Configuration Object to the communication device, the third DPP Configuration Object including the both of the first identifier and the second identifier selected in the list,
wherein the communication device establishes a wireless connection between the communication device and an access point for the first wireless network identified by the first identifier or an access point for the second wireless network identified by the second identifier by using the third DPP Configuration Object.

2. The non-transitory computer-readable medium as in claim 1, wherein
the computer-readable instructions cause the terminal device to:
after the instruction of selecting the both of the first identifier and the second identifier in the list is received, obtain the third public key.

3. The non-transitory computer-readable medium as in claim 1, wherein
the first identifier is a first Service Set Identifier (SSID), and
the second identifier is a second SSID.

4. The non-transitory computer-readable medium as in claim 1, wherein
the first identifier is a first group ID according to Device Provisioning Protocol (DPP) scheme, and
the second identifier is a second group ID according to the DPP scheme.

5. The non-transitory computer-readable medium as in claim 1, wherein
the communication device is a printer.

6. The non-transitory computer-readable medium as in claim 1, wherein
    the computer-readable instructions cause the terminal device to:
    obtain the third public key by capturing a QR code (registered trademark) displayed on the communication device.

7. The non-transitory computer-readable medium as in claim 1, wherein
    the access point for the first wireless network and the access point for the second wireless network are the same, where the first wireless network is formed by the access point for the first wireless network
    the second wireless network is formed by the access point for the second wireless network.

8. The non-transitory computer-readable medium as in claim 1, wherein
    the access point for the first wireless network and the access point for the second wireless network are different, where the first wireless network is formed by the access point for the first wireless network
    the second wireless network is formed by the access point for the second wireless network.

\* \* \* \* \*